US009563324B2

(12) United States Patent
Kida et al.

(10) Patent No.: US 9,563,324 B2
(45) Date of Patent: Feb. 7, 2017

(54) TOUCH PANEL SUBSTRATE, ELECTRONIC DEVICE, AND PRODUCTION METHOD FOR ELECTRONIC DEVICE

(71) Applicant: Sharp Kabushiki Kaisha, Osaka (JP)

(72) Inventors: Kazutoshi Kida, Osaka (JP); Shinji Matsumoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 15 days.

(21) Appl. No.: 14/442,664

(22) PCT Filed: Nov. 14, 2013

(86) PCT No.: PCT/JP2013/080784
§ 371 (c)(1),
(2) Date: May 13, 2015

(87) PCT Pub. No.: WO2014/077315
PCT Pub. Date: May 22, 2014

(65) Prior Publication Data
US 2016/0018929 A1    Jan. 21, 2016

(30) Foreign Application Priority Data

Nov. 14, 2012 (JP) .................................. 2012-250387

(51) Int. Cl.
*G06F 3/045* (2006.01)
*G06F 3/044* (2006.01)
*G06F 3/047* (2006.01)

(52) U.S. Cl.
CPC ............... *G06F 3/047* (2013.01); *G06F 3/044* (2013.01); *G06F 2203/04103* (2013.01); *G06F 2203/04112* (2013.01)

(58) Field of Classification Search
CPC  G06F 3/044; G06F 2203/04103; G06F 3/047; G06F 2203/04112
See application file for complete search history.

(56) References Cited

U.S. PATENT DOCUMENTS

2011/0291966 A1* 12/2011 Takao ..................... G06F 3/044
345/173
2012/0229416 A1* 9/2012 Ku ......................... G06F 3/044
345/174

FOREIGN PATENT DOCUMENTS

JP           4989749 B2    8/2012

* cited by examiner

*Primary Examiner* — Charles Hicks
(74) *Attorney, Agent, or Firm* — Chen Yoshimura LLP

(57) ABSTRACT

The present invention provides a touch panel substrate that allows for greater design freedom when designing conductive wire patterns for reducing occurrence of the moiré effect. The touch panel substrate includes: a first electrode layer that includes first conductive wires and second conductive wires; and a second electrode layer that includes third conductive wires and fourth conductive wires. When viewed in a plan view, the first conductive wires and the third conductive wires form first quadrilaterals, and the second conductive wires and the fourth conductive wire form second quadrilaterals. The first quadrilaterals and the second quadrilaterals are not identical to one another.

9 Claims, 18 Drawing Sheets

TOUCH PANEL SUBSTRATE, ELECTRONIC DEVICE, AND PRODUCTION METHOD FOR ELECTRONIC DEVICE

TECHNICAL FIELD

The present invention relates to a touch panel substrate, an electronic device provided with the touch panel substrate, and manufacturing method for the electronic device.

BACKGROUND ART

In recent years, integration of the input unit and the display unit in electronic devices has become more common in pursuit of more intuitive operation and miniaturization of the devices. Particularly in mobile electronic devices such as mobile telephones, personal digital assistants (PDAs), and notebook computers, a touch panel than can detect the position at which the screen of the device is contacted by an object for detection (such as a finger or a stylus) is often integrated into the display surface of the display device.

There are a variety of types of well known conventional touch panels such as the so-called resistive touch panels and capacitive touch panels. Among these, capacitive touch panels are used especially widely.

Capacitive touch panels detect the position at which the screen of the device is contacted by a finger or stylus by detecting the associated change in electrostatic capacitance that occurs.

In many cases, the so-called sensor electrodes that detect the position at which an object contacts the screen of the device are formed using indium tin oxide (ITO) or the like. However, in large-screen touch panel-equipped devices, the resistance of the ITO sensor electrodes increases to a point at which the detection ability of the device decreases.

Therefore, the sensor electrodes are sometimes formed using metal wires arranged in a mesh pattern (lattice pattern) in order to decrease the resistance of the sensor electrodes.

When using mesh-shaped sensor electrodes, visual interference sometimes occurs between the pixel array pattern of the display device and the mesh pattern of the sensor electrodes when the touch panel substrate and the display device are fixed together. This interference is known as the moiré effect. The moiré effect also sometimes occurs due to the positional relationship between sensor electrodes that run vertically and sensor electrodes that run horizontally. Occurrence of the moiré effect is not preferable because it can decrease the clarity of the images displayed on the display surface of the display device.

Patent Document 1 discloses a touch panel device in which occurrence of the moiré effect is reduced by overlaying a first electrode and a second electrode.

FIG. 20 is a plan view illustrating the configuration of the touch panel device disclosed in Patent Document 1, in which the first electrode and the second electrode are overlaid. The touch panel device disclosed in Patent Document 1 includes a plurality of mutually parallel first electrodes 203 and a plurality of mutually parallel second electrodes 205 that intersect with the first electrodes 203. The first electrodes 203 and the second electrodes 205 each have a diamond lattice pattern, and when the first electrodes 203 and the second electrodes 205 are overlaid, a square-shaped interference pattern occurs in directions that are rotated at angles θ and 90°−θ relative to a first direction parallel to the direction in which the terminals of each first electrode 203 are arranged or relative to a second direction parallel to the direction in which the terminals of each second electrode 205 are arranged.

This reduces occurrence of the moiré effect when the first electrodes 203 and the second electrodes 205 are overlaid in the touch panel device disclosed in Patent Document 1.

RELATED ART DOCUMENT

Patent Document

Patent Document 1: Japanese Patent Application Laid-Open Publication, "Japanese Patent Application Laid-Open Publication No. 4989749 (Issued on Aug. 1, 2012)"

SUMMARY OF THE INVENTION

Problems to be Solved by the Invention

When using mesh-shaped electrodes, occurrence of the moiré effect due to interference with the pixel array pattern of the display device must be considered, and therefore the mesh pattern for the sensor electrodes must be designed according to the display device that will be used.

In the touch panel device disclosed in Patent Document 1, a square-shaped interference pattern occurs when the first electrodes 203 and the second electrodes 205 are overlaid, and the orientation of this square-shaped interference pattern relative to the first direction or the second direction is determined by the interior angles of the diamond lattice patterns used for the first electrodes 203 and the second electrodes 205.

In the touch panel device disclosed in Patent Document 1, the orientation of this square-shaped interference pattern relative to the first direction or the second direction can only be changed by changing the interior angles of the diamond lattice patterns, and the sizes of two different square-shaped patterns that occur in two different directions cannot be changed.

There are some cases in which, depending on the pixel array pattern used in the display device, it is not possible to reduce occurrence of the moiré effect simply by changing the orientation of the square-shaped interference patterns relative to the first direction or the second direction.

Therefore, occurrence of the moiré effect cannot be adequately reduced for all of the large variety of pixel array patterns that may be present in the display device.

The present invention was made in view of such problems and aims to provide a touch panel substrate that allows for greater design freedom when designing conductive wire patterns for reducing occurrence of the moiré effect when used in a first electrode layer and a second electrode layer and that can also reduce occurrence of the moiré effect when used in combination with any of the wide variety of pixel array patterns that may be present in a display device. The present invention also aims to provide an electronic device equipped with such a touch panel substrate.

Means for Solving the Problems

In order to solve the abovementioned problems, one aspect of the present invention is a touch panel substrate, including: a first electrode layer and a second electrode layer, wherein the first electrode layer includes a plurality of mutually parallel first conductive wires and a plurality of mutually parallel second conductive wires that intersect with the first conductive wires, wherein the second electrode layer includes a plurality of mutually parallel third conductive wires and a plurality of mutually parallel fourth conductive wires that intersect with the third conductive wires, wherein an angle between the first conductive wires and the second conductive wires is not equal to 90°, and the first conductive wires and second conductive wires form a lattice pattern that includes a plurality of parallelograms in which in each parallelogram, adjacent sides have different lengths, wherein an angle between the third conductive wires and the fourth conductive wires is not equal to 90°, and the third conductive wires and fourth conductive wires form a lattice pattern that includes a plurality of parallelograms in which in each parallelogram, adjacent sides have different lengths, wherein the first electrode layer and the second electrode layer being overlaid in a plan view causes the adjacent first conductive wires and adjacent third conductive wires to define a plurality of first quadrilaterals, and the adjacent second conductive wires and adjacent fourth conductive wires to define a plurality of second quadrilaterals, and wherein the first quadrilaterals and the second quadrilaterals are not identical.

In order to solve the abovementioned problems, one aspect of the present invention is a method of manufacturing an electronic device, including: forming a first electrode layer; and forming a second electrode layer over the first electrode layer, wherein the first electrode layer includes a plurality of mutually parallel first conductive wires and a plurality of mutually parallel second conductive wires that intersect with the first conductive wires, wherein the second electrode layer includes a plurality of mutually parallel third conductive wires and a plurality of mutually parallel fourth conductive wires that intersect with the third conductive wires, wherein an angle between the first conductive wires and the second conductive wires is not equal to 90°, and the first conductive wires and second conductive wires form a lattice pattern that includes a plurality of parallelograms in which in each parallelogram, adjacent sides have different lengths, wherein an angle between the third conductive wires and the fourth conductive wires is not equal to 90°, and the third conductive wires and fourth conductive wires form a lattice pattern that includes a plurality of parallelograms in which in each parallelogram, adjacent sides have different lengths, wherein the first electrode layer and the second electrode layer being overlaid in a plan view causes the adjacent first conductive wires and adjacent third conductive wires to define a plurality of first quadrilaterals, and the adjacent second conductive wires and adjacent fourth conductive wires to define a plurality of second quadrilaterals, and wherein the first quadrilaterals and the second quadrilaterals are not identical.

Effects of the Invention

One aspect of the present invention makes it possible to provide a touch panel substrate that allows for greater design freedom when designing conductive wire patterns for reducing occurrence of the moiré effect when used in a first electrode layer and a second electrode layer and that can also can reduce occurrence of the moiré effect when used in combination with any of the wide variety of pixel array patterns that may be present in display devices. One aspect of the present invention also makes it possible to provide an electronic device equipped with such a touch panel substrate.

DETAILED DESCRIPTION OF EMBODIMENTS

Embodiment 1

An embodiment of the present invention will be described in detail below with reference to FIGS. 1 to 14.

Figure 1:
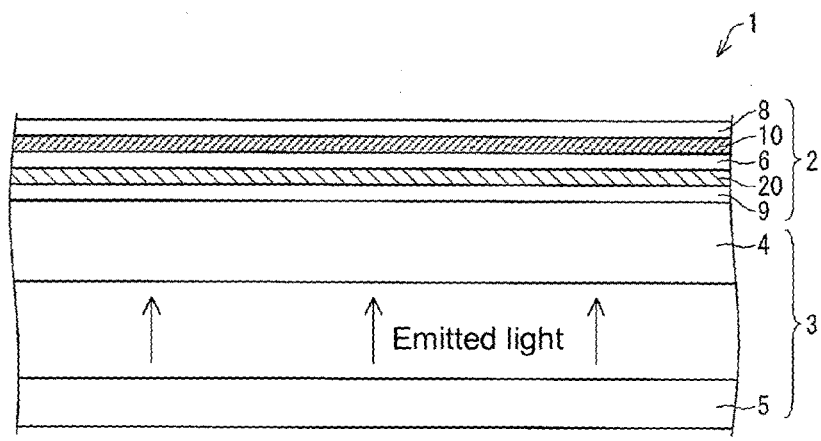
FIG. 1 is a cross-sectional view of an electronic device according to Embodiment 1 of the present invention.

FIG. 1 is a cross-sectional view of an electronic device 1 of the present embodiment. As shown in FIG. 1, the electronic device 1 includes a touch panel substrate 2 and a display device 3.

Any of a variety of types of display devices such as a liquid crystal display device or an organic electroluminescent display device can be used for the display device 3. The display device 3 includes: a display panel 4; and a backlight 5 that is arranged on the rear side of the display panel 4 (that is, on the side opposite to the display surface of the display panel 4) and illuminates the display panel 4 with light. The display device 3 also includes various drive circuits (not shown in the figure) for controlling the images that are displayed on the display surface of the display panel 4.

An active matrix liquid crystal display panel in which a liquid crystal layer is sandwiched between an active matrix substrate and a color filter substrate can be used for the display panel 4, for example.

<Touch Panel Substrate>

The touch panel substrate 2 is a capacitive touch panel substrate and is arranged on the display surface side (that is, on the user side) of the display panel 4. The touch panel substrate 2 includes: a substrate 6; a first electrode layer 10; a second electrode layer 20; a first protective layer 8; and a second protective layer 9. The first electrode layer 10 is arranged on the front side of the substrate 6, and the second electrode layer 20 is arranged on the rear side of the substrate 6. In other words, the first electrode layer 10 and the second electrode layer 20 face one another, sandwiching the substrate 6 therebetween.

The substrate 6 is made from a dielectric material such as glass or a plastic film, for example.

The first protective layer 8 is arranged on the front side of the first electrode layer 10. The second protective layer 9 is arranged on the rear side of the second electrode layer 20.

The first protective layer 8 is the surface with which objects for detection will come into contact and can be made from a transparent insulating material such as glass or a plastic film. The second protective layer 9 can also be made from a transparent insulating material such as glass or a plastic film. The second protective layer 9 is adhered to the display panel 4.

<Electrode Layers>

Next, the configurations of the first electrode layer 10 and the second electrode layer 20 of the touch panel substrate according to the present embodiment will be described in detail.

Figure 2:
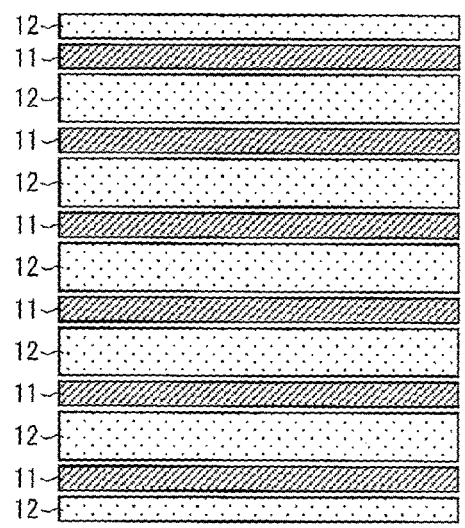
FIG. 2 is a plan view illustrating a configuration of a first electrode layer of a touch panel substrate according to Embodiment 1 of the present invention.
Figure 3:
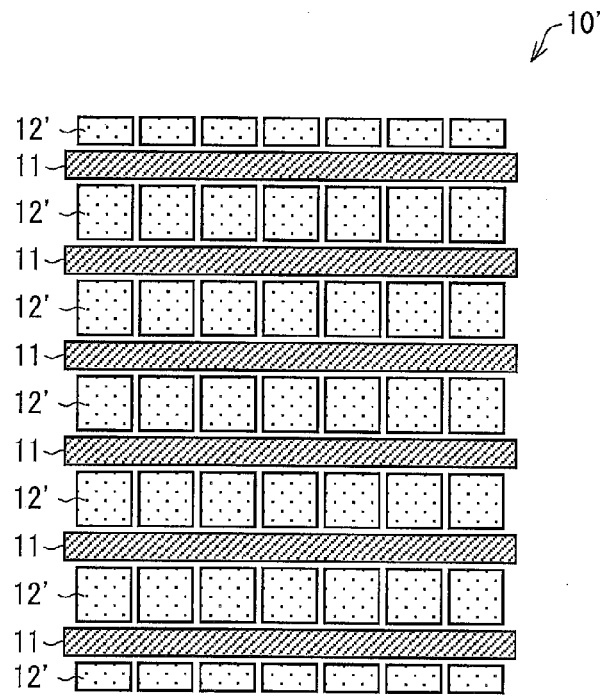
FIG. 3 is a plan view illustrating another example of a configuration of a first electrode layer of a touch panel substrate according to Embodiment 1 of the present invention.
Figure 4:
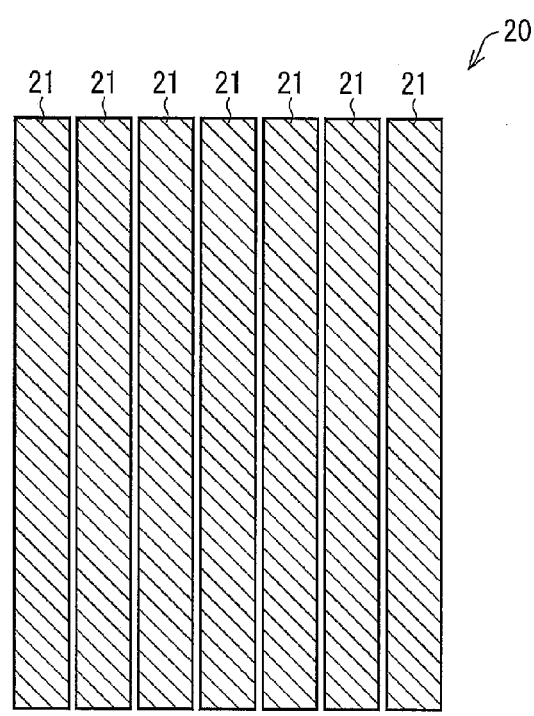
FIG. 4 is a plan view illustrating a configuration of a second electrode layer of the touch panel substrate according to Embodiment 1 of the present invention.

FIG. 2 is a plan view illustrating a configuration of the first electrode layer 10 of the touch panel substrate according to the present embodiment. FIG. 3 is a plan view illustrating a configuration of a first electrode layer 10', which is another example of the first electrode layer of the touch panel substrate according to the present embodiment. FIG. 4 is a plan view illustrating a configuration of the second electrode layer 20 of the touch panel substrate according to the present embodiment.

As shown in FIG. 2, the first electrode layer 10 includes a plurality of first sensor electrodes 11 that run horizontally in the figure. Moreover, floating electrodes 12 are formed between adjacent first sensor electrodes 11. Each of the first sensor electrodes 11 and the floating electrodes 12 has a thin rectangular shape.

Moreover, the first electrode layer 10' shown in FIG. 3, for example, may also be used for the first electrode layer in the present embodiment. The floating electrodes 12' of the first electrode layer 10' are shaped differently than the floating electrodes 12 of the first electrode layer 10 shown in FIG. 2. More specifically, in contrast to the floating electrodes 12, a plurality of divisions are that run vertically in FIG. 3 are formed in the floating electrodes 12'. This makes the width of the floating electrodes 12' equal to the width of second sensor electrodes.

As shown in FIG. 4, the second electrode layer 20 includes a plurality of second sensor electrodes 21 that run vertically in the figure. Each of the second sensor electrodes 21 has a thin rectangular shape.

Figure 5:
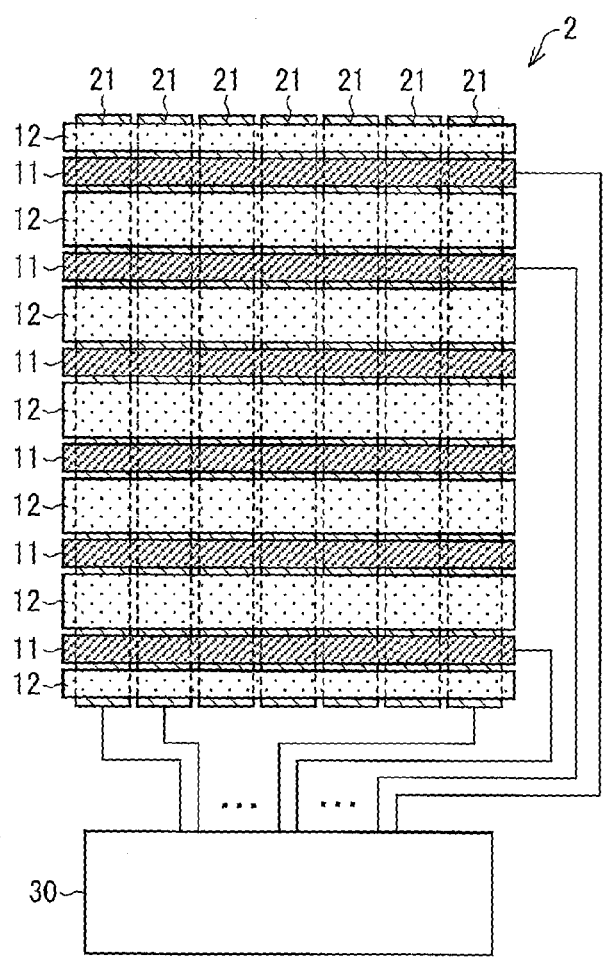
FIG. 5 is a plan view illustrating a configuration of the touch panel substrate according to Embodiment 1 of the present invention once the first electrode layer and the second electrode layer have been overlaid.
Figure 6:
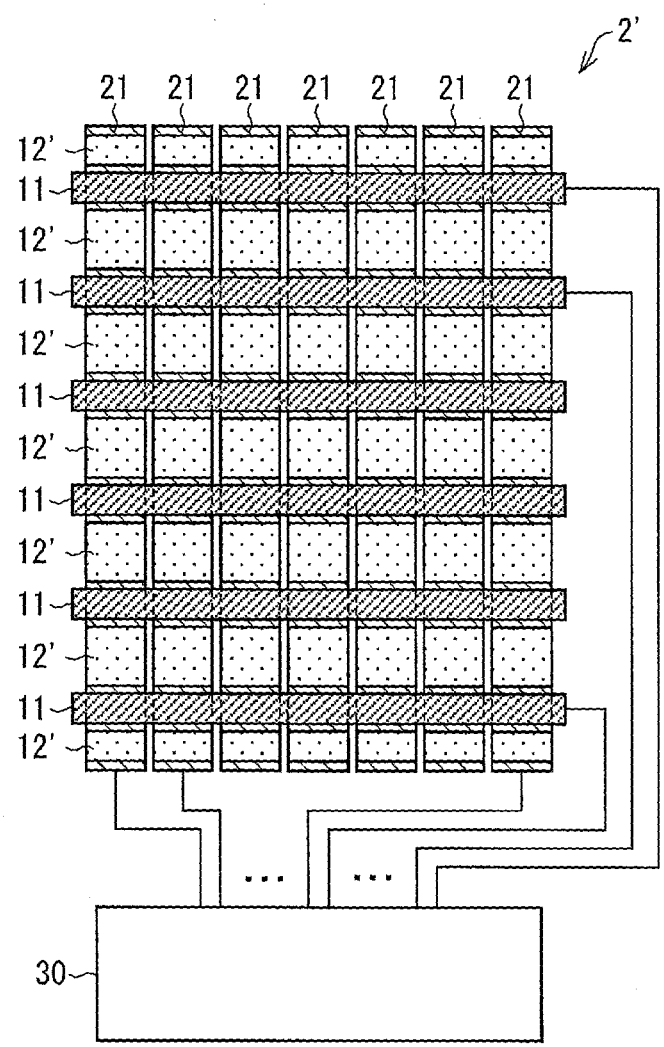
FIG. 6 is a plan view illustrating another example of a configuration of the touch panel substrate according to Embodiment 1 of the present invention once the first electrode layer and the second electrode layer have been overlaid.

FIG. 5 is a plan view illustrating a configuration of the touch panel substrate 2 according to the present embodiment once the first electrode layer 10 and the second electrode layer 20 have been overlaid. FIG. 6 is a plan view illustrating another example of a configuration of the touch panel substrate 2 according to the present embodiment once the first electrode layer 10' and the second electrode layer 20 have been overlaid.

As shown in FIGS. 5 and 6, in the touch panel substrate 2, the first electrode layer 10 and the second electrode layer 20 are arranged, with the substrate 6 sandwiched therebetween, such that the first sensor electrodes 11 and the second sensor electrodes 21 intersect when viewed in a plan view. Moreover, each first sensor electrode 11 and each second sensor electrode 21 is connected to a position detection circuit 30.

As described above, in the touch panel substrate 2 according to the present embodiment, the first sensor electrodes 11 and the second sensor electrodes 21 form a simple matrix pattern.

Electrostatic capacitance forms between the first sensor electrodes 11 and the second sensor electrodes 21. When an object for detection such as a human finger comes into contact with the surface of the touch panel substrate 2, the value of this electrostatic capacitance changes. The position detection circuit 30 then detects this change in the value of the electrostatic capacitance to identify the position at which the object for detection contacted the surface of the touch panel substrate 2 (the first protective layer 8).

For example, by applying a drive voltage to the first sensor electrodes 11 and measuring the resulting change in voltage of the second sensor electrodes 21, the individual first sensor electrodes 11 (rows) and second sensor electrodes 21 (columns) in which a change in electrostatic capacitance occurred can be identified.

Moreover, any well known circuit can be used for the position detection circuit 30 that detects the coordinates of the position of the object for detection. The type of circuit used for the position detection circuit 30 is not particularly limited.

Next, the configurations of the first electrode layer 10 and the second electrode layer 20 of the touch panel substrate 2 according to the present embodiment will be described in more detail.

The first electrode layer 10 and the second electrode layer 20 of the touch panel substrate 2 according to the present embodiment each include conductive wires that are arranged in a mesh pattern. Moreover, the first sensor electrodes 11, the floating electrodes 12, and the second sensor electrodes 21 are formed using these conductive wires. It is preferable that a material having a relatively low electrical resistance such as a metal be used for the conductive wires.

<First Electrode Layer>

Figure 7:
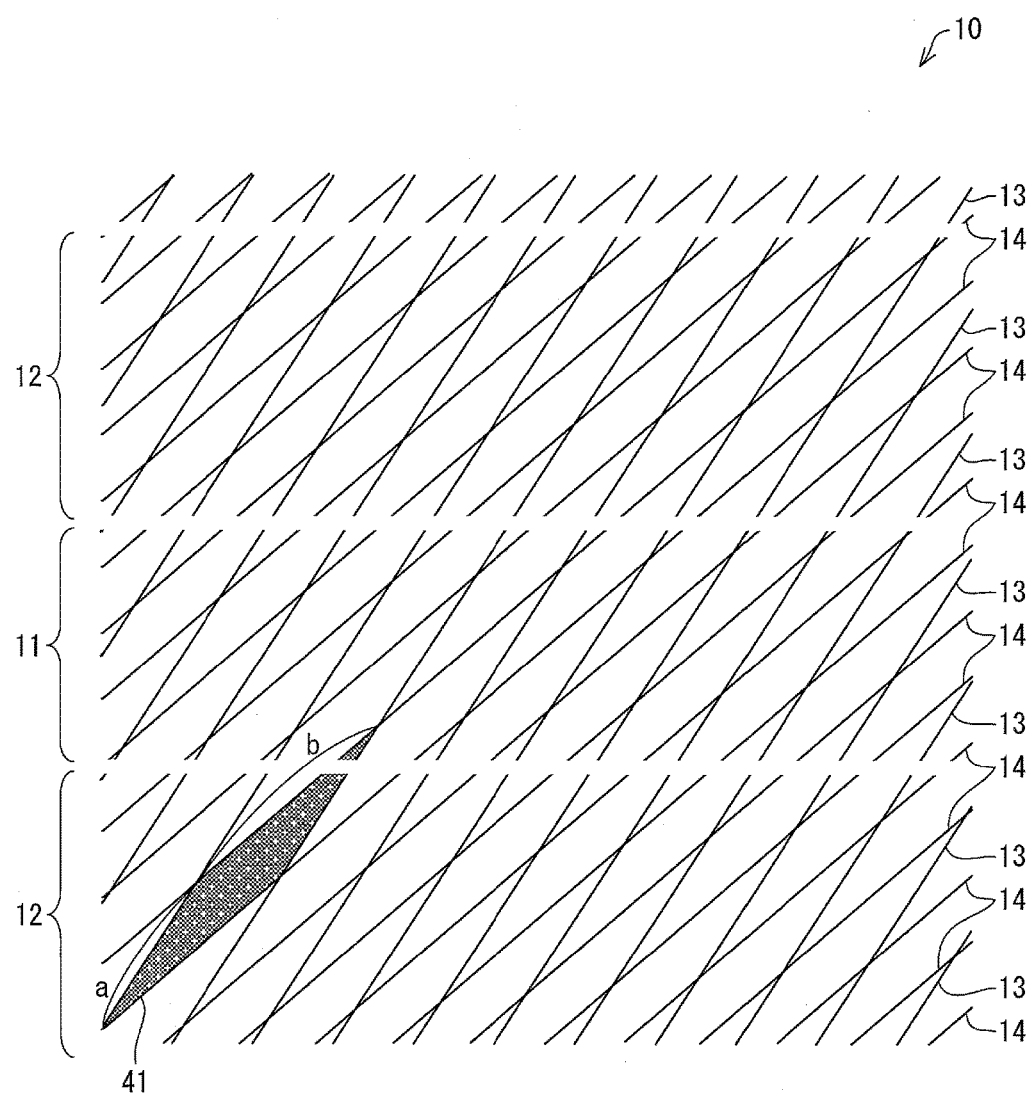
FIG. 7 is a plan view illustrating the details of a configuration of the first electrode layer of the touch panel substrate according to Embodiment 1 of the present invention.

FIG. 7 is a plan view illustrating the details of the configuration of the first electrode layer 10 of the touch panel substrate according to the present embodiment.

The first electrode layer 10 includes: a plurality of mutually parallel first conductive wires 13; and a plurality of mutually parallel second conductive wires 14 that intersect with the first conductive wires 13. The first conductive wires 13 are arranged with a prescribed gap between each adjacent first conductive wire 13, and the second conductive wires 14 are also arranged with a prescribed gap between each adjacent second conductive wire 14.

The angle between the first conductive wires 13 and the second conductive wires 14 is not equal to 90°. In other words, the first conductive wires 13 and the second conductive wires 14 are not orthogonal to one another when viewed in a plan view.

Furthermore, the gap between adjacent first conductive wires 13 is different than the gap between adjacent second conductive wires 14.

This creates a lattice-shaped conductive wire pattern in the first electrode layer 10 when viewed in a plan view. This lattice pattern includes a plurality of parallelograms 41 that are formed by the first conductive wires 13 and the second conductive wires 14 and in which adjacent sides of each individual parallelogram have different lengths. These parallelograms 41 represent the smallest (quadrilateral) lattice units of the lattice pattern. In the parallelogram 41 shown in FIG. 7, the adjacent sides a and b of the parallelogram 41 have different lengths.

In the first electrode layer 10 of the present embodiment, the conductive wire pattern formed by the first conductive wires 13 and the second conductive wires 14 is divided into a plurality of regions. These regions, in turn, form the first sensor electrodes 11 or the floating electrodes 12.

For example, in the lattice-shaped conductive wire pattern that includes a plurality of parallelograms, divisions that follow the thin rectangular shape of the first sensor electrodes 11 can be inserted to sever the first conductive wires 13 and the second conductive wires 14, thereby creating a plurality of divided regions. This results in the conductive wires within one region being insulated from the conductive wires in the other regions. These divided regions, in turn, form the first sensor electrodes 11 and the floating electrodes 12.

It should be noted that the parallelograms 41 of the present invention do not necessarily need to be fully closed on all four sides as long as the external shape of each parallelogram 41 is substantially parallelogram-shaped. In other words, as shown in FIG. 7, divisions are inserted in the conductive wire pattern to form the first sensor electrodes 11, thereby severing the first conductive wires 13 and the second conductive wires 14 that form the sides of the parallelograms. However, the external shape of each parallelogram is still substantially parallelogram-shaped.

The method used to form the conductive wire pattern that includes the first conductive wires 13 and the second conductive wires 14 will be described in more detail later.

<Second Electrode Layer>

Figure 8:
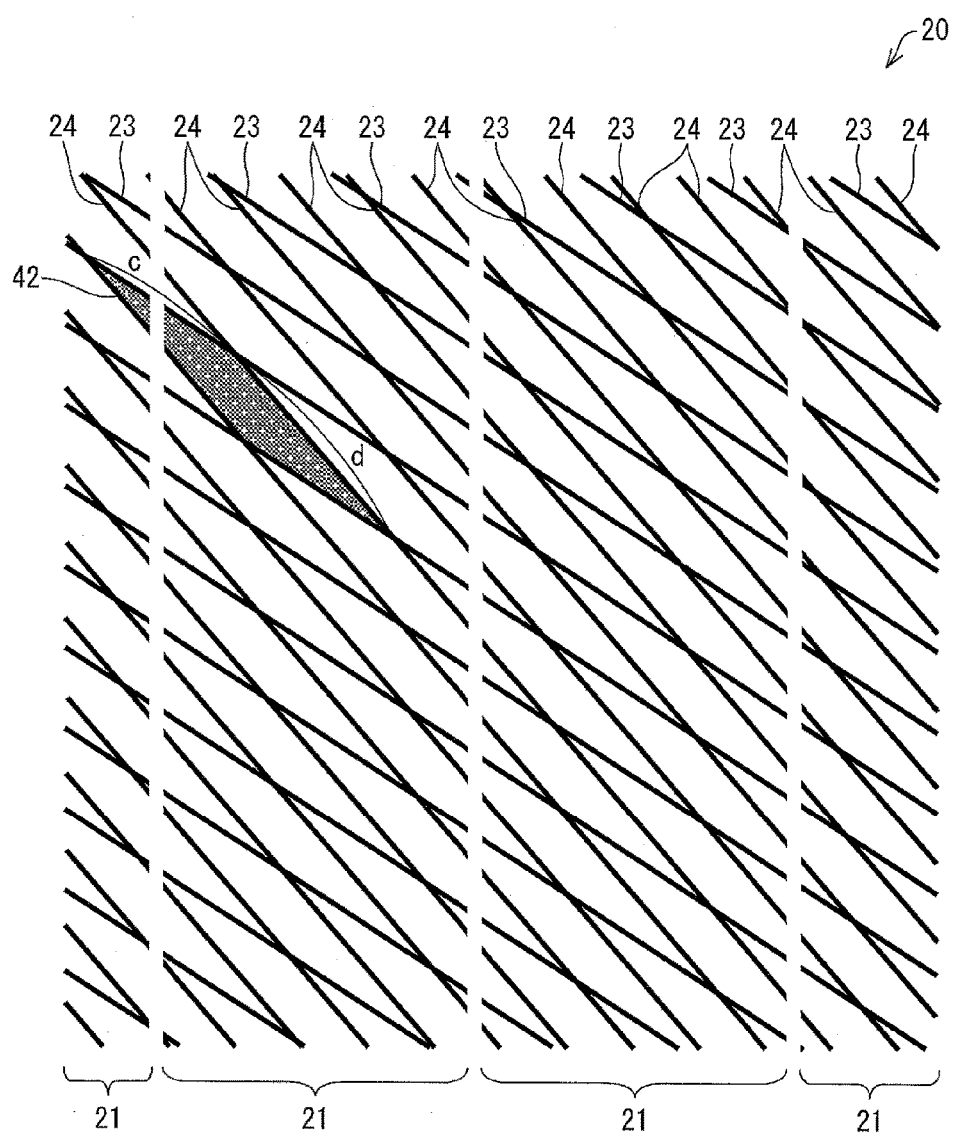
FIG. 8 is a plan view illustrating the details of a configuration of the second electrode layer of the touch panel substrate according to Embodiment 1 of the present invention.

FIG. 8 is a plan view illustrating the details of the configuration of the second electrode layer 20 of the touch panel substrate according to the present embodiment.

The second electrode layer 20 includes: a plurality of mutually parallel third conductive wires 23; and a plurality of mutually parallel fourth conductive wires 24 that intersect with the third conductive wires 23. The third conductive wires 23 are arranged with a prescribed gap between each adjacent third conductive wire 23, and the fourth conductive wires 24 are also arranged with a prescribed gap between each adjacent fourth conductive wire 24.

Note that for purposes of explanation, the first conductive wires 13 and the second conductive wires shown in FIG. 7 are depicted with a different thickness than the third conductive wires 23 and the fourth conductive wires 24 shown in FIG. 8. However, the thicknesses of each conductive wire in the actual touch panel substrate 2 is not particularly limited. This note also applies to the following description.

The angle between the third conductive wires 23 and the fourth conductive wires 24 is not equal to 90°. In other words, the third conductive wires 23 and the fourth conductive wires 24 are not orthogonal to one another when viewed in a plan view.

Furthermore, the gap between adjacent third conductive wires 23 is different than the gap between adjacent fourth conductive wires 24.

This creates a lattice-shaped conductive wire pattern in the second electrode layer 20 when viewed in a plan view. This lattice pattern includes a plurality of parallelograms 42 that are formed by the third conductive wires 23 and the fourth conductive wires 24 and in which adjacent sides of each individual parallelogram have different lengths. These parallelograms 42 represent the smallest (quadrilateral) lattice units of the lattice pattern. In the parallelogram 42 shown in FIG. 8, the adjacent sides c and d of the parallelogram 42 have different lengths.

In the second electrode layer 20 of the present embodiment, the conductive wire pattern formed by the third conductive wires 23 and the fourth conductive wires 24 is divided into a plurality of regions. These regions, in turn, form the second sensor electrodes 21.

For example, in the lattice-shaped conductive wire pattern that includes a plurality of parallelograms, divisions that follow the thin rectangular shape of the second sensor electrodes 21 can be inserted to sever the third conductive wires 23 and the fourth conductive wires 24, thereby creating a plurality of divided regions in the conductive wire pattern. This results in the conductive wires within one region being insulated from the conductive wires in the other regions. These divided regions, in turn, form the second sensor electrodes 21.

Moreover, it is preferable that the conductive wire pattern of the second electrode layer 20 of the present embodiment have the same general configuration as the conductive wire pattern of the first electrode layer 10 but be rotated 90° clockwise therefrom when viewed in a plan view, as shown in FIG. 8. More specifically, it is preferable that the third conductive wires 23 be rotated 90° clockwise from the first conductive wires 13 when viewed in a plan view and that the fourth conductive wires 24 be rotated 90° clockwise from the second conductive wires 14 when viewed in a plan view.

Moreover, the second electrode layer 20 may include floating electrodes like those formed in the first electrode layer 10.

It should be noted that the parallelograms 42 of the present invention do not necessarily need to be fully closed on all four sides as long as the external shape of each parallelogram 42 is substantially parallelogram-shaped. In other words, as shown in FIG. 8, divisions are inserted in the conductive wire pattern to form the second sensor electrodes 21, thereby severing the third conductive wires 23 and the fourth conductive wires 24 that form the sides of the parallelograms. However, the external shape of each parallelogram is still substantially parallelogram-shaped.

The method used to form the conductive wire pattern that includes the third conductive wires 23 and the fourth conductive wires 24 will be described in more detail later.

<Conductive Wire Pattern>

Figure 9:
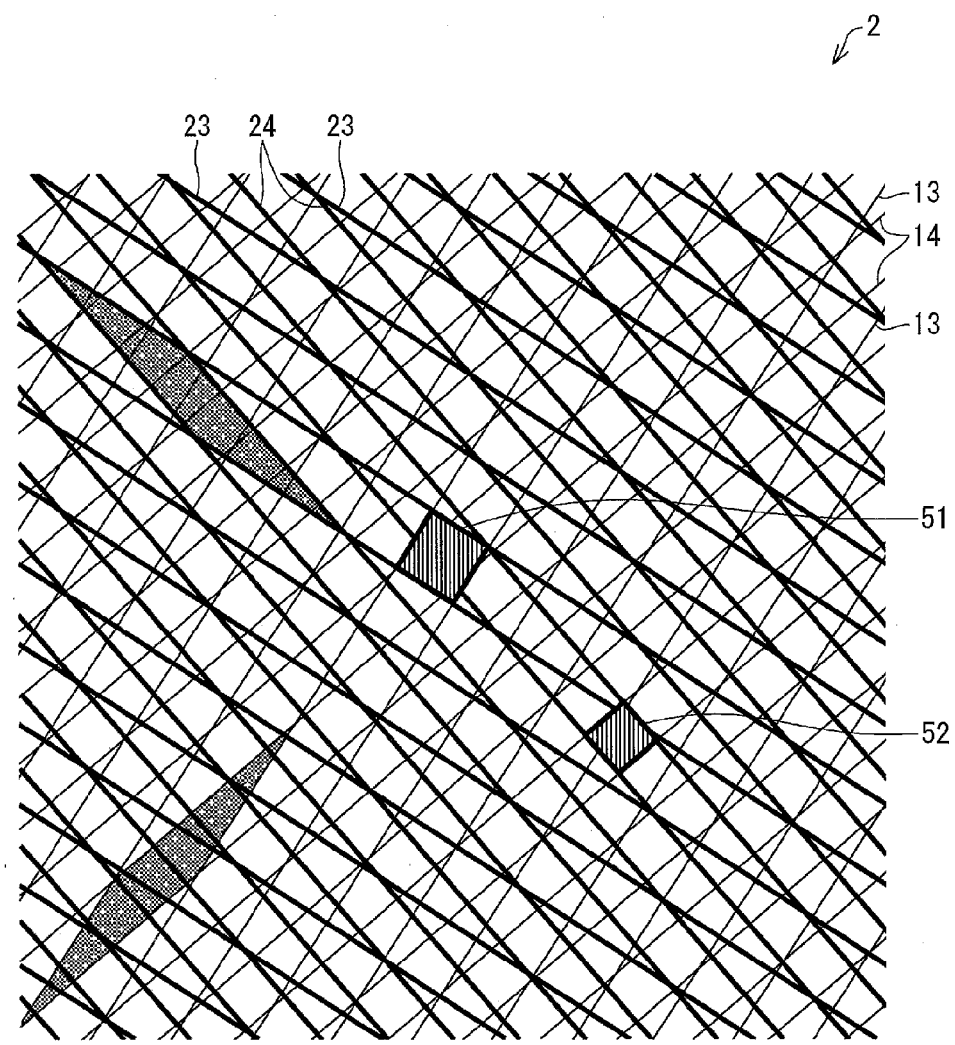
FIG. 9 is a plan view illustrating the details of a configuration of the touch panel substrate according to Embodiment 1 of the present invention once the first electrode layer and the second electrode layer have been overlaid.

FIG. 9 is a plan view illustrating the details of the configuration of the touch panel substrate 2 according to the present embodiment once the first electrode layer 10 and the second electrode layer 20 have been overlaid. Note that for purposes of explanation, the divisions in the first electrode layer 10 and the second electrode layer 20 are not shown in FIG. 9.

As shown in FIG. 9, once the first electrode layer 10 and the second electrode layer 20 are overlaid, the first conductive wires 13, the second conductive wires 14, the third conductive wires 23, and the fourth conductive wires 24 each run in different directions.

In this state, each pair of two adjacent first conductive wires 13 and two adjacent third conductive wires 23 form first quadrilaterals 51 that are square-shaped when viewed in a plan view. Moreover, each pair of two adjacent second conductive wires 14 and two adjacent fourth conductive wires 24 form second quadrilaterals 52 that are also square-shaped when viewed in a plan view.

It should be noted that when the first quadrilaterals 51 and the second quadrilaterals 52 are square-shaped, the overall conductive wire pattern is less perceptible to the user than when other polygonal shapes are formed. Therefore, while it is preferable that the first quadrilaterals 51 and the second quadrilaterals 52 be square-shaped, the first quadrilaterals 51 and the second quadrilaterals 52 do not necessarily have to be square-shaped in the present invention.

The first quadrilaterals 51 form a matrix pattern that is parallel to the directions in which the first conductive wires 13 and the third conductive wires 23 run. Moreover, the second quadrilaterals 52 form a matrix pattern that is parallel to the directions in which the second conductive wires 14 and the fourth conductive wires 24 run.

Here, the length of at least one side of each first quadrilateral 51 is equal to the gap between adjacent first conductive wires 13. Moreover, the length of at least one side of each second quadrilateral 52 is equal to the gap between adjacent second conductive wires 14.

As described above, the lengths of adjacent sides of the parallelograms 41 of the first electrode layer 10 are different, and the gap between adjacent first conductive wires 13 is different than the gap between adjacent second conductive wires 14. Moreover, the lengths of adjacent sides of the parallelograms 42 of the second electrode layer 20 are different, and the gap between adjacent third conductive wires 23 is different than the gap between adjacent fourth conductive wires 24.

Therefore, the first quadrilaterals 51 and the second quadrilaterals 52 are shaped differently in terms of size and area; that is, the first quadrilaterals 51 and the second quadrilaterals 52 have non-identical quadrilateral shapes.

In this way, when the first electrode layer 10 and the second electrode layer 20 of the touch panel substrate according to the present embodiment are overlaid, the conductive wires form two different quadrilateral shapes when viewed in a plan view.

When the display device 3 and the touch panel substrate 2 are fixed to one another, the moiré effect occurs due to interference between the pixel array pattern of the display device 3 and the conductive wire pattern of the touch panel substrate 2.

Depending on the design of the display device 3, any of a variety of pixel array patterns can be used. Therefore, a variety of different pixel array pattern characteristics such as pixel size and the gap between adjacent pixels can be present in the display device 3.

Because a variety of pixel array patterns can be used, a variety of conductive wire patterns can be used in the touch panel substrate 2. This allows greater design freedom for the conductive wire patterns, which can be designed appropriately in order to reduce occurrence of the moiré effect.

Occurrence of the moiré effect can therefore be reduced by selecting an optimal conductive wire pattern for use in conjunction with a given pixel array pattern of the display device 3.

When the first electrode layer 10 and the second electrode layer 20 of the touch panel substrate 2 according to the present embodiment are overlaid, the conductive wires form two different quadrilateral shapes when viewed in a plan view. This allows for greater design freedom when designing conductive wire patterns for reducing occurrence of the moiré effect than in conventional touch panel substrates in which only a single quadrilateral shape is formed.

This, in turn, makes it possible to provide a touch panel substrate 2 with which occurrence of the moiré effect can be reduced when used with a display device 3 in which any of a variety of pixel array patterns is used.

<Pixel Array and Conductive Wire Pattern>

Figure 10:
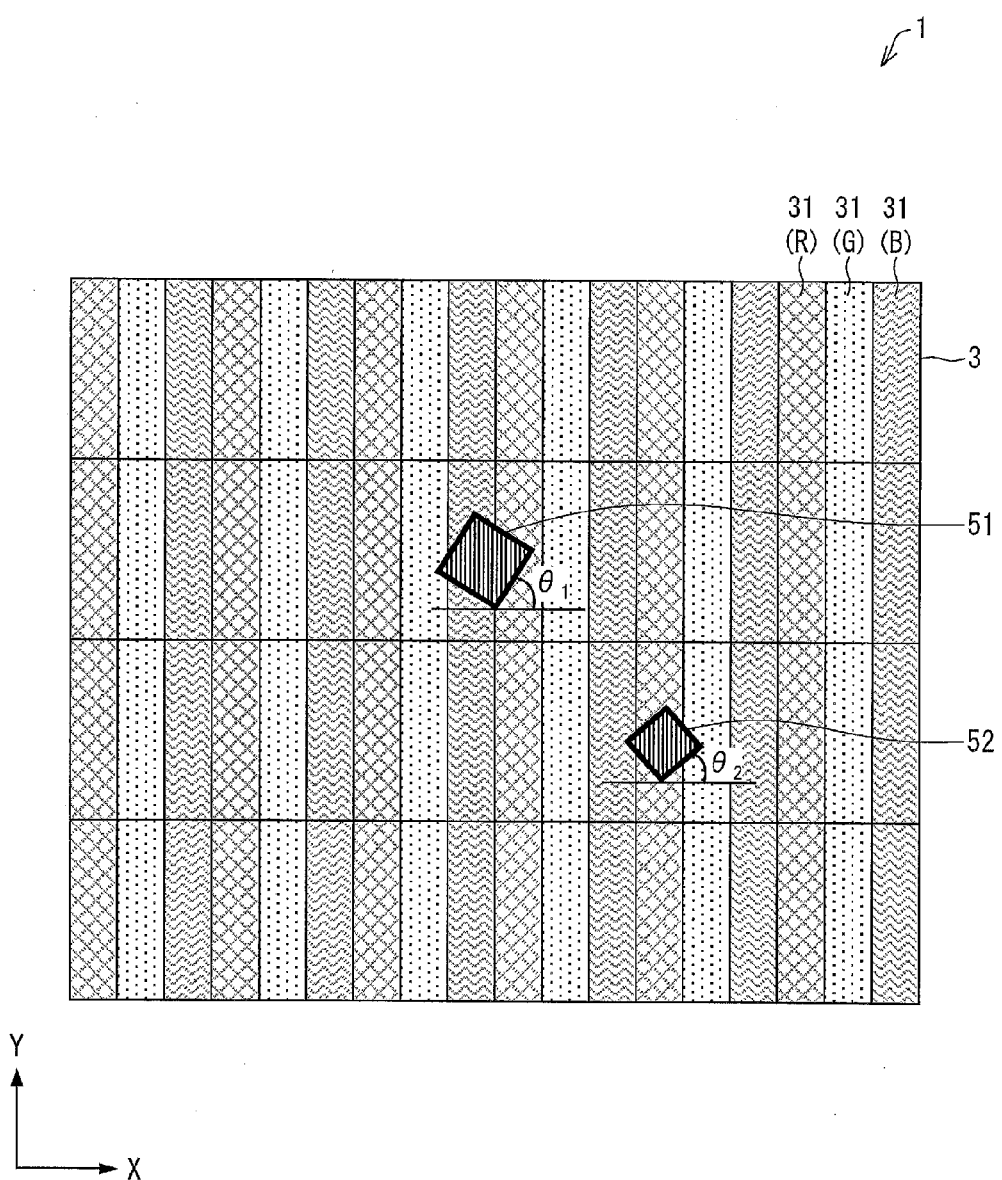
FIG. 10 is a plan view illustrating a configuration of a touch panel substrate relative to a pixel array of a display device in an electronic device according to Embodiment 1 of the present invention.
Figure 11:
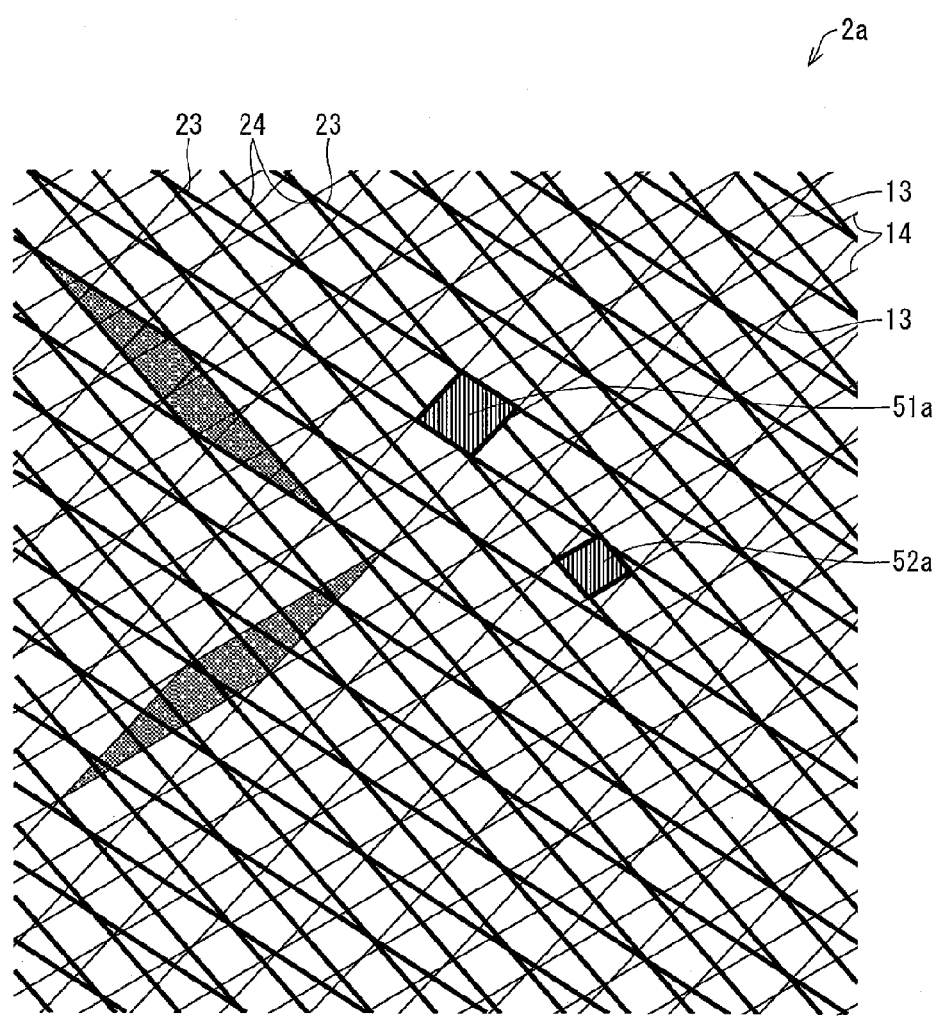
FIG. 11 is a plan view illustrating the details of a configuration of a touch panel substrate according to Modification Example 1 of Embodiment 1 of the present invention once the first electrode layer and the second electrode layer have been overlaid.

FIG. 10 is a plan view illustrating the configuration of the touch panel substrate 2 relative to a pixel array of the display device 3 in the electronic device 1 according to the present embodiment.

FIG. 10 shows the first quadrilateral 51 formed by the first conductive wires 13 and the third conductive wires 23 and the second quadrilateral 52 formed by the second conductive wires 14 and the fourth conductive wires 24.

Moreover, the display panel 4 of the display device 3 includes a large number of pixels arranged in a matrix pattern. The display panel 4 of the present embodiment includes red (R) pixels that emit red light, green (G) pixels that emit green light, and blue (B) pixels that emit blue light.

Here, as shown in FIG. 10, it is preferable that the diagonal length of the first quadrilaterals 51 and the diagonal length of the second quadrilaterals 52 be no more than four times the pixel pitch, and it is more preferable that these diagonal lengths be no more than three times the pixel pitch. This makes the first to fourth conductive wires less perceptible to the user.

Modification Examples

Next, touch panel substrates of modification examples of the present embodiment will be described with reference to FIGS. 11 to 14. FIGS. 11 to 14 are plan views illustrating the details of configurations of touch panel substrates 2a to 2d of modification examples of the present embodiment once the first electrode layer 10 and the second electrode layer 20 have been overlaid.

Above, a configuration in which the conductive wire pattern of the second electrode layer 20 is rotated 90° clockwise from the conductive wire pattern of the first electrode layer 10 when viewed in a plan view was described as a preferred example.

However, the touch panel substrate of the present embodiment is not limited to this configuration. As shown in the touch panel substrate 2a in FIG. 11, the conductive wire pattern of the second electrode layer 20 may be rotated 80° clockwise from the conductive wire pattern of the first electrode layer 10 when viewed in a plan view.

More specifically, the third conductive wires 23 may be rotated 80° clockwise from the first conductive wires 13 when viewed in a plan view, and the fourth conductive wires 24 may be rotated 80° clockwise from the second conductive wires 14 when viewed in a plan view.

In this case, the parallelograms formed by the third conductive wires 23 and the fourth conductive wires 24 are rotated 80° clockwise from the parallelograms formed by the first conductive wires 13 and the second conductive wires 14.

In the touch panel substrate 2a, each pair of two adjacent first conductive wires 13 and two adjacent third conductive wires 23 form first quadrilaterals 51a that are parallelogram-shaped when viewed in a plan view. Moreover, each pair of two adjacent second conductive wires 14 and two adjacent fourth conductive wires 24 form second quadrilaterals 52a that are also parallelogram-shaped when viewed in a plan view.

Therefore, the first quadrilaterals 51a and the second quadrilaterals 52a are shaped differently in terms of size and area; that is, the first quadrilaterals 51a and the second quadrilaterals 52a have non-identical quadrilateral shapes.

When the first electrode layer 10 and the second electrode layer 20 of the touch panel substrate 2a according to the modification example of the present embodiment are overlaid, the conductive wires form two different quadrilateral shapes when viewed in a plan view Like in the touch panel substrate 2, this allows for greater design freedom when designing conductive wire patterns for reducing occurrence of the moiré effect.

This, in turn, makes it possible to provide a touch panel substrate 2a with which occurrence of the moiré effect can be reduced when used with a display device 3 in which any of a variety of pixel array patterns is used.

Figure 12:
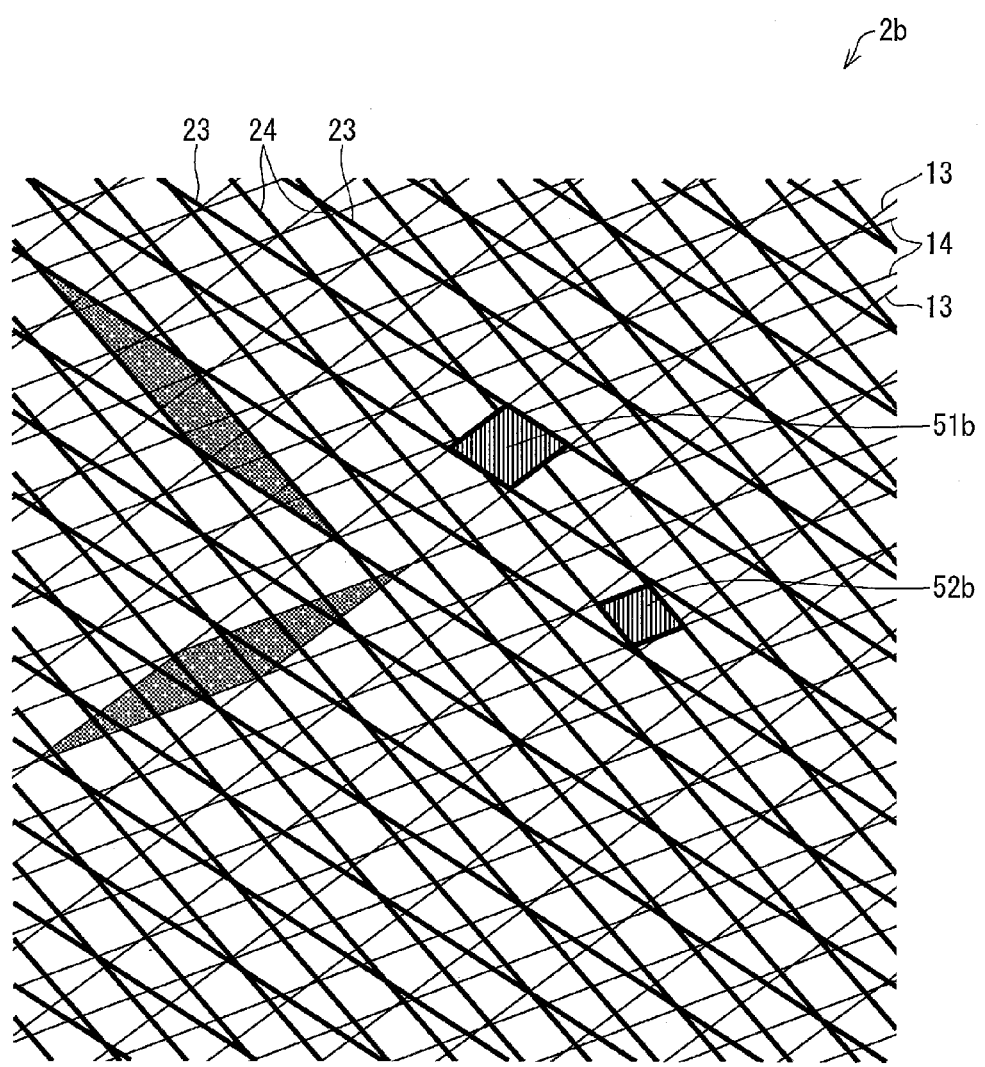
FIG. 12 is a plan view illustrating the details of a configuration of a touch panel substrate according to Modification Example 2 of Embodiment 1 of the present invention once the first electrode layer and the second electrode layer have been overlaid.

Moreover, as shown in the touch panel substrate 2b in FIG. 12, the conductive wire pattern of the second electrode layer 20 may be rotated 70° clockwise from the conductive wire pattern of the first electrode layer 10 when viewed in a plan view.

In this case, each pair of two adjacent first conductive wires 13 and two adjacent third conductive wires 23 form first quadrilaterals 51b that are parallelogram-shaped when viewed in a plan view. Moreover, each pair of two adjacent second conductive wires 14 and two adjacent fourth conductive wires 24 form second quadrilaterals 52b that are also parallelogram-shaped when viewed in a plan view.

Figure 13:
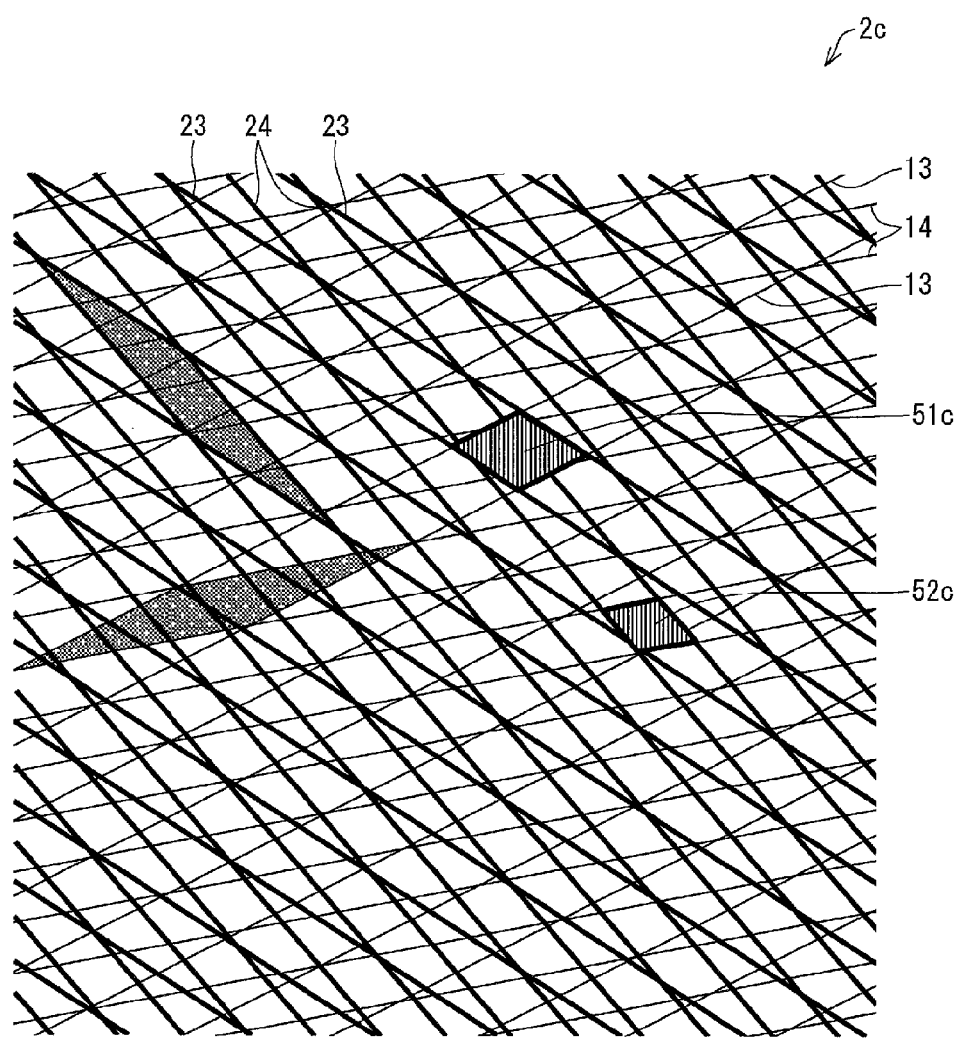
FIG. 13 is a plan view illustrating the details of a configuration of a touch panel substrate according to Modification Example 3 of Embodiment 1 of the present invention once the first electrode layer and the second electrode layer have been overlaid.

Moreover, as shown in the touch panel substrate 2c in FIG. 13, the conductive wire pattern of the second electrode layer 20 may be rotated 60° clockwise from the conductive wire pattern of the first electrode layer 10 when viewed in a plan view.

In this case, each pair of two adjacent first conductive wires 13 and two adjacent third conductive wires 23 form first quadrilaterals 51c that are parallelogram-shaped when viewed in a plan view. Moreover, each pair of two adjacent second conductive wires 14 and two adjacent fourth conductive wires 24 form second quadrilaterals 52c that are also parallelogram-shaped when viewed in a plan view.

Figure 14:
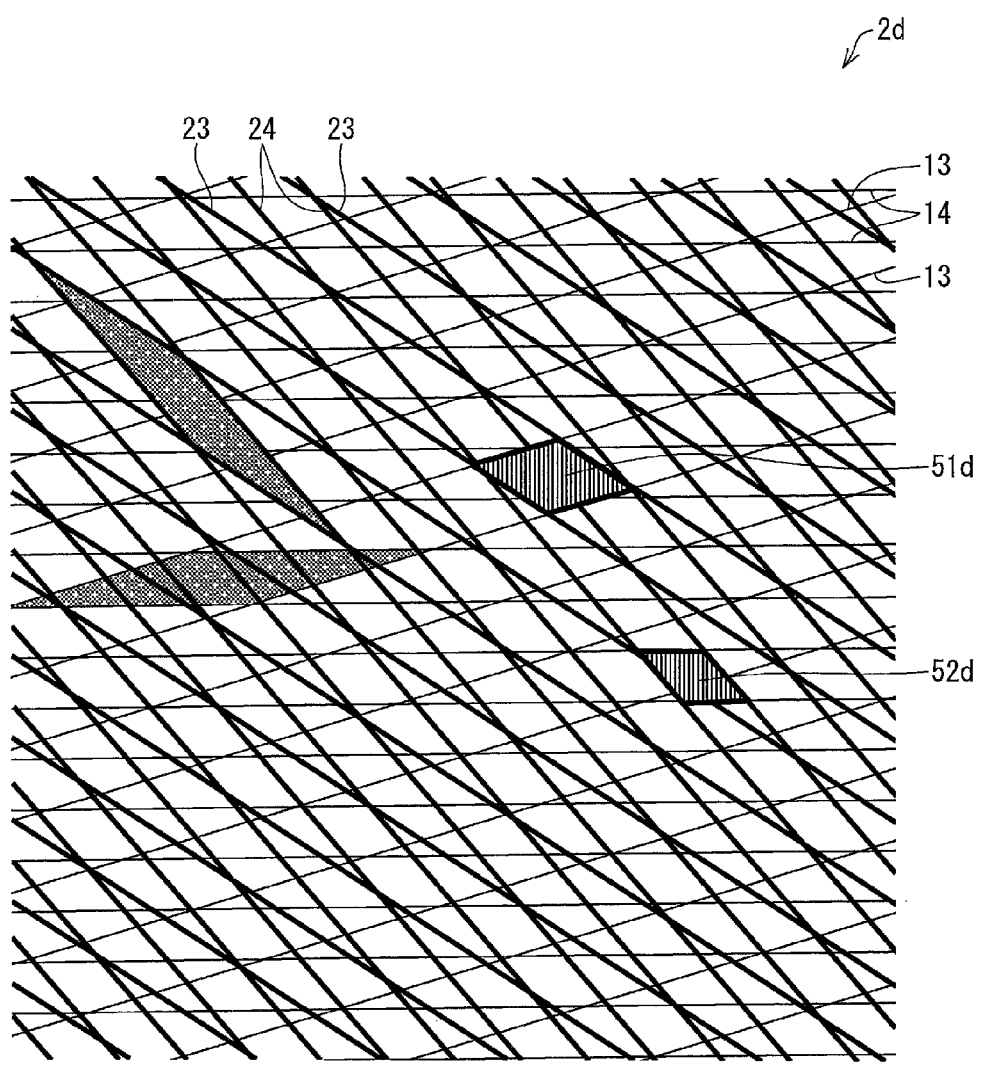
FIG. 14 is a plan view illustrating the details of a configuration of a touch panel substrate according to Modification Example 4 of Embodiment 1 of the present invention once the first electrode layer and the second electrode layer have been overlaid.

Moreover, as shown in the touch panel substrate 2d in FIG. 14, the conductive wire pattern of the second electrode layer 20 may be rotated 50° clockwise from the conductive wire pattern of the first electrode layer 10 when viewed in a plan view.

In this case, each pair of two adjacent first conductive wires 13 and two adjacent third conductive wires 23 form first quadrilaterals 51d that are parallelogram-shaped when viewed in a plan view. Moreover, each pair of two adjacent second conductive wires 14 and two adjacent fourth conductive wires 24 form second quadrilaterals 52d that are also parallelogram-shaped when viewed in a plan view.

The interior angles of the first quadrilaterals 51a to 51d depend on the angles between the first conductive wires 13 and the third conductive wires 23, and the interior angles of the second quadrilaterals 52a to 52d depend on the angles between the second conductive wires 14 and the fourth conductive wires 24.

Therefore, as shown in FIGS. 11 to 14, the interior angles of the first quadrilaterals and the interior angles of the second quadrilaterals can be changed by changing the angle between the first conductive wires 13 and the third conductive wires 23 and also by changing the angle between the second conductive wires 14 and the fourth conductive wires 24.

In this way, the touch panel substrate of the present invention can be designed to give the first quadrilaterals and the second quadrilaterals any quadrilateral shape, thereby allowing for greater design freedom when designing conductive wire patterns for reducing occurrence of the moiré effect.

<Process for Forming Conductive Wire Pattern>

Next, a method of manufacturing the electronic device of the present embodiment (which includes the touch panel substrate 2 and the display device 3) will be described.

The method of manufacturing the electronic device of the present embodiment includes a process for forming the conductive wire patterns of the first electrode layer 10 and the second electrode layer 20. These conductive wire patterns are designed to reduce occurrence of the moiré effect that occurs due to interference between the conductive wire patterns of the touch panel substrate 2 and the pixels of the display device 3 when the touch panel substrate 2 and the display device 3 are fixed to one another.

The process for forming the conductive wire patterns of the first electrode layer 10 and the second electrode layer 20 includes the following steps.

First, the sizes and bias angles of the first quadrilaterals 51 and the second quadrilaterals 52 that are formed when the first electrode layer 10 and the second electrode layer 20 are overlaid are determined. Here, as shown in FIG. 10, "bias angles" refers to the angles $\theta_1$ and $\theta_2$, where $\theta_1$ is the angle between the direction in which the pixels are arranged (the X direction in the figure) and one side of the first quadrilateral 51 and $\theta_2$ is the angle between the direction in which the pixels are arranged and one side of the second quadrilateral 52.

Values for the sizes and bias angles of the first quadrilaterals 51 and the second quadrilaterals 52 are selected on the basis of which values will most effectively reduce occurrence of the moiré effect when the touch panel substrate 2 and the display device 3 are fixed to one another.

More specifically, a plurality of conductive wire test patterns, each being a lattice pattern in which the sizes of the quadrilaterals therein are different, are prepared. Next, two of these conductive wire test patterns are overlaid and then arranged on the display surface of the display panel 4 of the display device 3. Then, the two conductive wire test patterns are rotated clockwise in plan view to adjust the bias angles of the quadrilaterals. The combination of the two conductive wire test patterns and the optimal bias angles therefor are determined on the basis of which patterns/bias angle values most effectively reduce occurrence of the moiré effect on the display surface of the display device 3.

Next, of the two different types of quadrilaterals formed by overlaying the two conductive wire test patterns, one of the quadrilaterals is selected to be the first quadrilateral 51, and the opposite sides of each of these first quadrilaterals 51 become the positions at which the first conductive wires 13 will be arranged. Similarly, the other one of the quadrilaterals is selected to be the second quadrilateral 52, and the opposite sides of each of these second quadrilaterals 52 become the positions at which the second conductive wires 14 will be arranged. Moreover, the other pair of opposite sides of the first quadrilaterals 51 become the positions at which the third conductive wires 23 will be arranged, and similarly, the other pair of opposite sides of the second quadrilaterals 52 become the positions at which the fourth conductive wires 24 will be arranged.

Next, on one surface of the substrate 6, a plurality of first conductive wires 13 are formed with a uniform gap therebetween, and a plurality of second conductive wires 14 are also formed with a uniform gap therebetween. This completes the first electrode layer 10. Moreover, on the other surface of the substrate 6, a plurality of third conductive wires 23 are formed with a uniform gap therebetween, and a plurality of fourth conductive wires 24 are also formed with a uniform gap therebetween. This completes the second electrode layer 20. Here, the method used to form the conductive wires on the substrate 6 is not particularly limited, and any well known method can be used.

Next, divisions are inserted in the conductive wire patterns formed as described above in order to form the first sensor electrodes 11, the second sensor electrodes 21, and the floating electrodes 12.

Forming the first sensor electrodes 11 and the second sensor electrodes 21 using the method described above makes it possible to produce a touch panel substrate 2 having conductive wire patterns that more effectively reduce occurrence of the moiré effect when the touch panel substrate 2 is fixed to a display device 3.

Moreover, in the method for forming the conductive wire patterns described above, the sensor electrodes can be formed in any shape according to the positions at which the divisions are inserted.

Embodiment 2

Another embodiment of the present invention will be described below with reference to FIGS. 15 to 19. For convenience, the same reference characters are used to indicate components that have the same functions as components described in the previous embodiments, and the description of those components will be omitted here.

Figure 15:
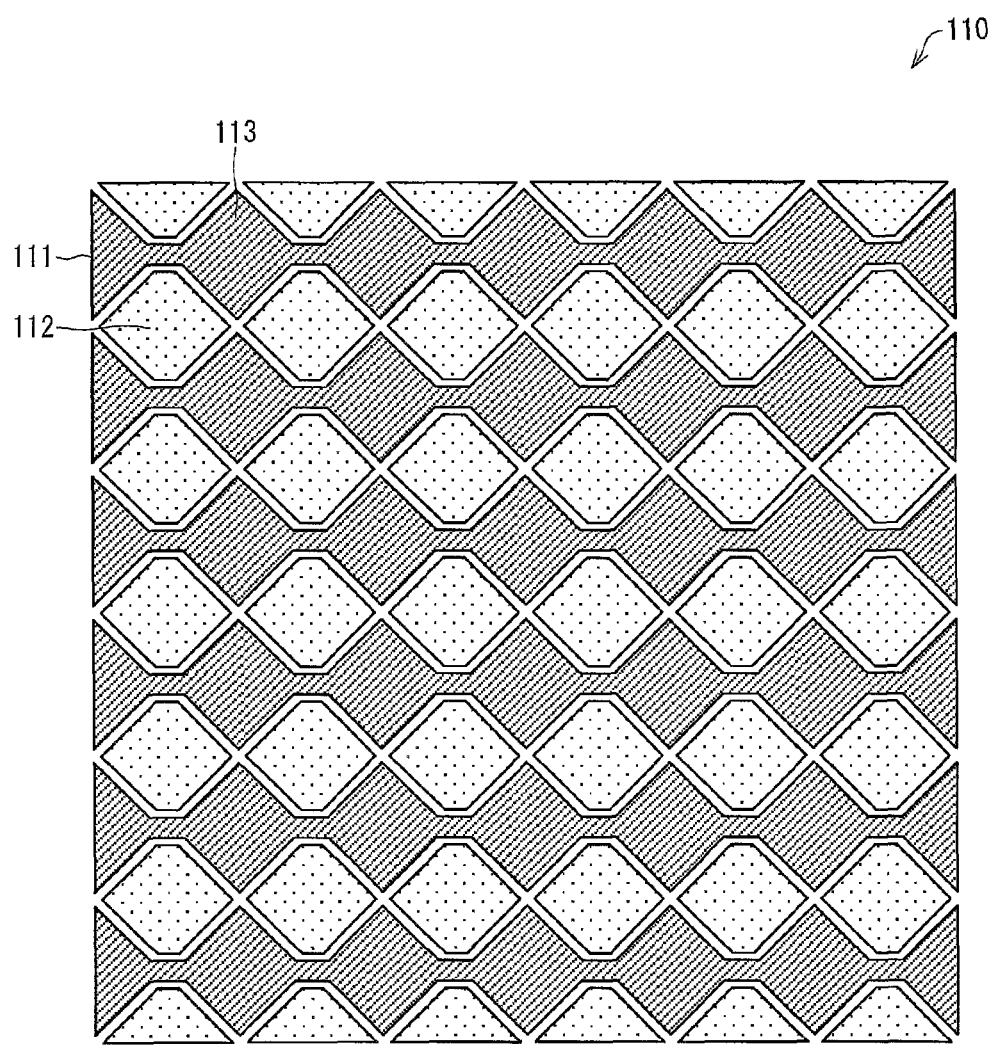
FIG. 15 is a plan view illustrating a configuration of a first electrode layer of a touch panel substrate according to Embodiment 2 of the present invention.
Figure 16:
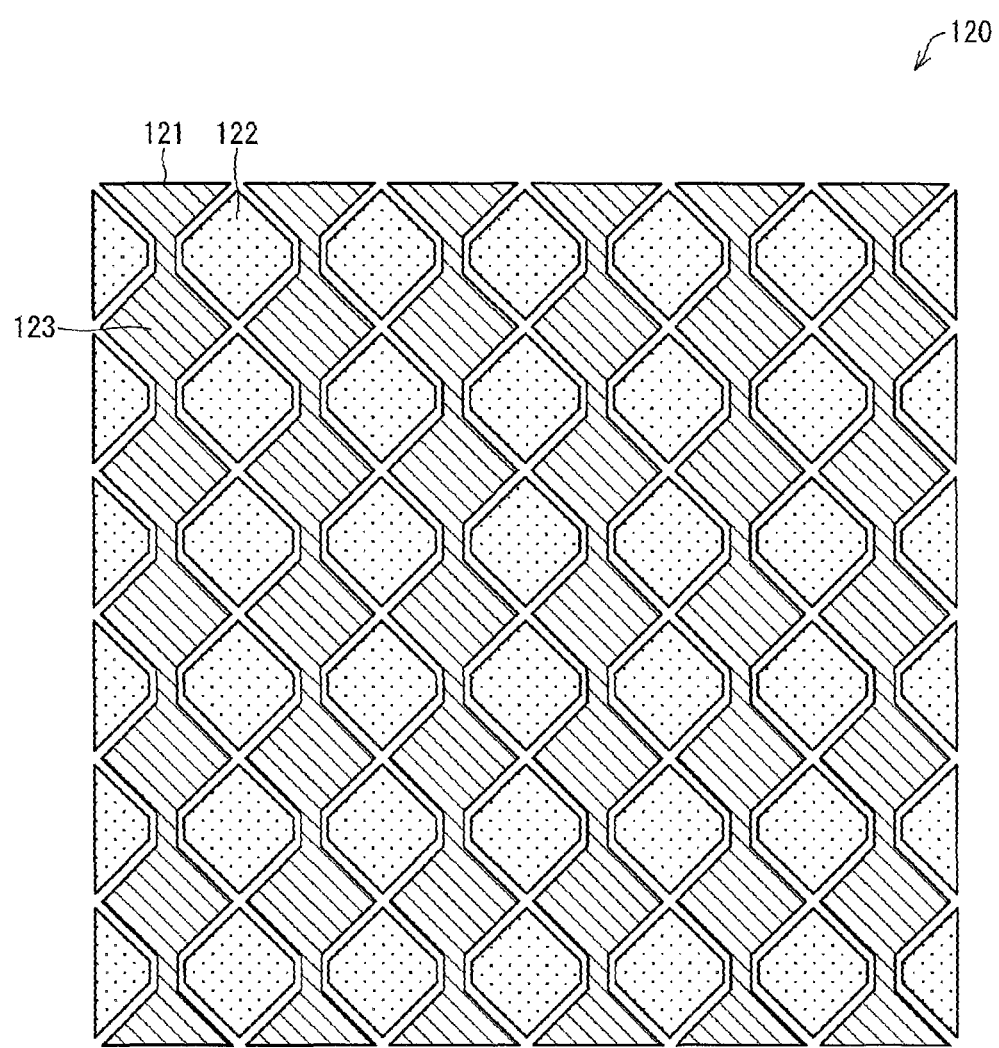
FIG. 16 is a plan view illustrating a configuration of a second electrode layer of the touch panel substrate according to Embodiment 2 of the present invention.

FIG. 15 is a plan view illustrating a configuration of a first electrode layer 110 of a touch panel substrate 102 according to the present embodiment. FIG. 16 is a plan view illustrating a configuration of a second electrode layer 120 of the touch panel substrate 102 according to the present embodiment.

As shown in FIG. 15, the first electrode layer 110 of the present embodiment includes a plurality of first sensor electrodes 111 that run horizontally in the figure. The first sensor electrodes 111 include a plurality of quadrilateral-shaped lattice electrodes 113 in which adjacent lattice electrodes 113 share a vertex and are connected together thereby. In other words, the first sensor electrodes 111 include a plurality of lattice electrodes 113 in which the vertices of adjacent lattice electrodes 113 are connected together. Moreover, a plurality of first floating electrodes 112 are formed in the spaces between the lattice electrodes 113.

As shown in FIG. 16, the second electrode layer 120 of the present embodiment includes a plurality of second sensor electrodes 121 that run vertically in the figure. The second sensor electrodes 121 include a plurality of quadrilateral-shaped lattice electrodes 123 in which adjacent lattice electrodes 123 share a vertex and are connected together thereby. In other words, the second sensor electrodes 121 include a plurality of lattice electrodes 123 in which the vertices of adjacent lattice electrodes 123 are connected together. Moreover, a plurality of second floating electrodes 122 are formed in the spaces between the lattice electrodes 123.

Figure 17:
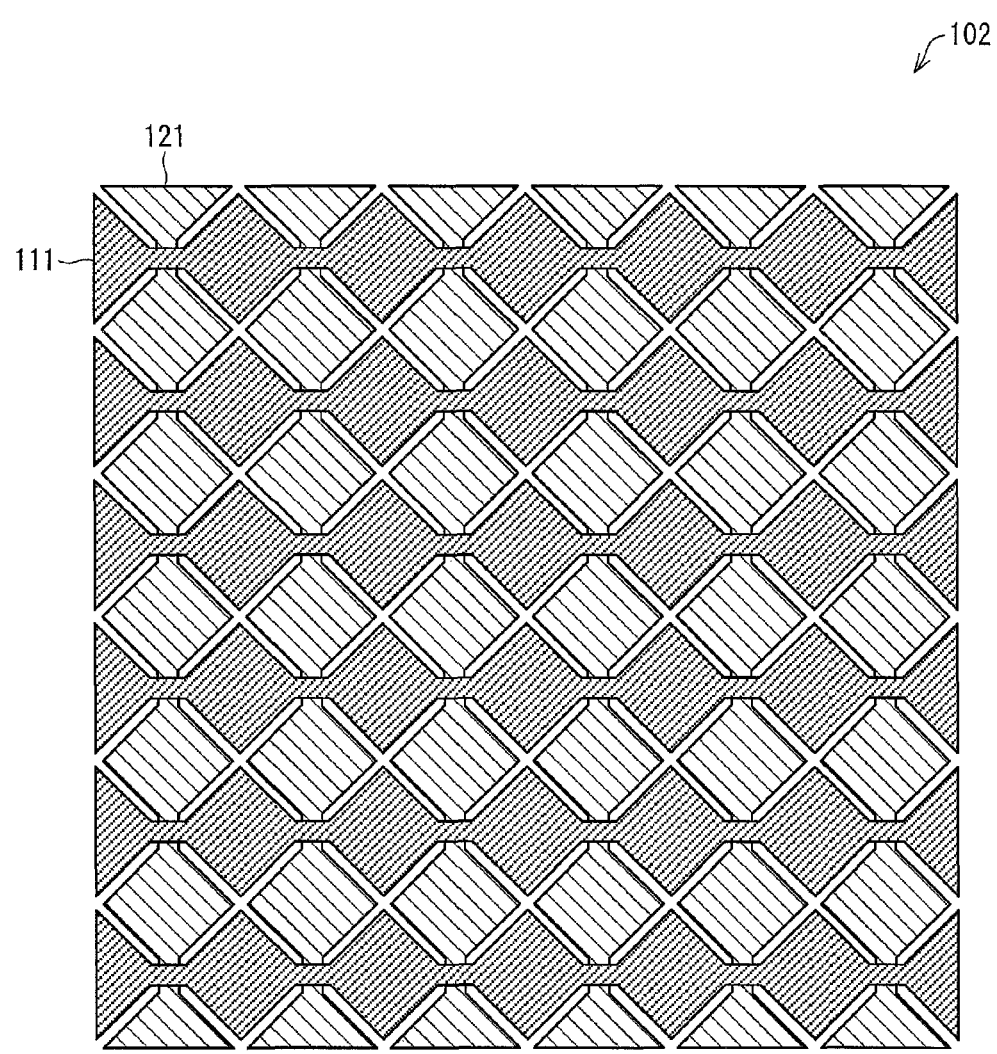
FIG. 17 is a plan view illustrating the details of a configuration of the touch panel substrate according to Embodiment 2 of the present invention once the first electrode layer and the second electrode layer have been overlaid.

FIG. 17 is a plan view illustrating a configuration of the touch panel substrate 102 according to the present embodiment once the first electrode layer 110 and the second electrode layer 120 have been overlaid.

As shown in FIG. 17, in the touch panel substrate 102, the first electrode layer 110 and the second electrode layer 120 are arranged, with the substrate 6 sandwiched therebetween, such that the first sensor electrodes 111 and the second sensor electrodes 121 intersect when viewed in a plan view. Moreover, when viewed in a plan view, the lattice electrodes 113 of the first sensor electrodes 111 overlap with the second floating electrodes 122, and the lattice electrodes 123 of the second sensor electrodes 121 overlap with the first floating electrodes 112.

As described above, the touch panel substrate 102 of the present embodiment includes first sensor electrodes 111 and second sensor electrodes 121 arranged in a diamond pattern.

<First Electrode Layer>

Next, the configuration of the first electrode layer 110 of the touch panel substrate according to the present embodiment will be described in detail.

Figure 18:
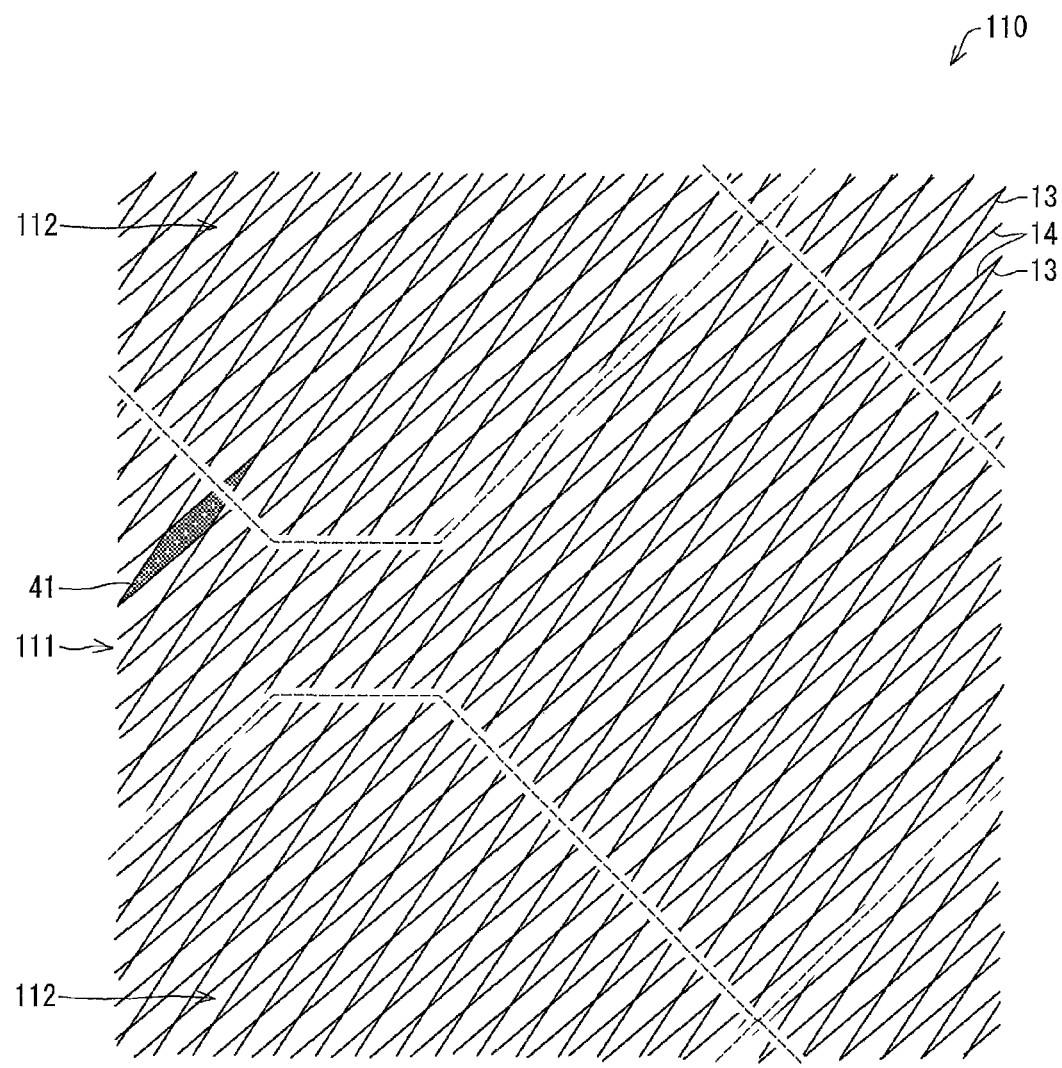
FIG. 18 is a plan view illustrating the details of a configuration of the first electrode layer of the touch panel substrate according to Embodiment 2 of the present invention.

FIG. 18 is a plan view illustrating the details of the configuration of the first electrode layer 110 of the touch panel substrate 102 according to the present embodiment. For purposes of explanation, FIG. 18 includes dashed lines that illustrate the boundaries between adjacent first sensor electrodes.

The first electrode layer 110 of the present embodiment includes a conductive wire pattern formed by first conductive wires 13 and second conductive wires 14. The same conductive wire pattern used in Embodiment 1 can be used, and therefore a detailed description of the conductive wire pattern is omitted here.

In the first electrode layer 110 of the present embodiment, the first conductive wires 13 and the second conductive wires 14 are divided into a plurality of regions to form the first sensor electrodes 111. These first sensor electrodes 111 are shaped differently than the first sensor electrodes 11 in Embodiment 1.

In other words, divisions that follow the shapes of the first sensor electrodes 111 are inserted in the conductive wire pattern formed by the first conductive wires 13 and the second conductive wires 14 in order to form the first sensor electrodes 111.

In this conductive wire pattern, the non-first sensor electrode 111 regions are the first floating electrodes 112.

<Second Electrode Layer>

Figure 19:
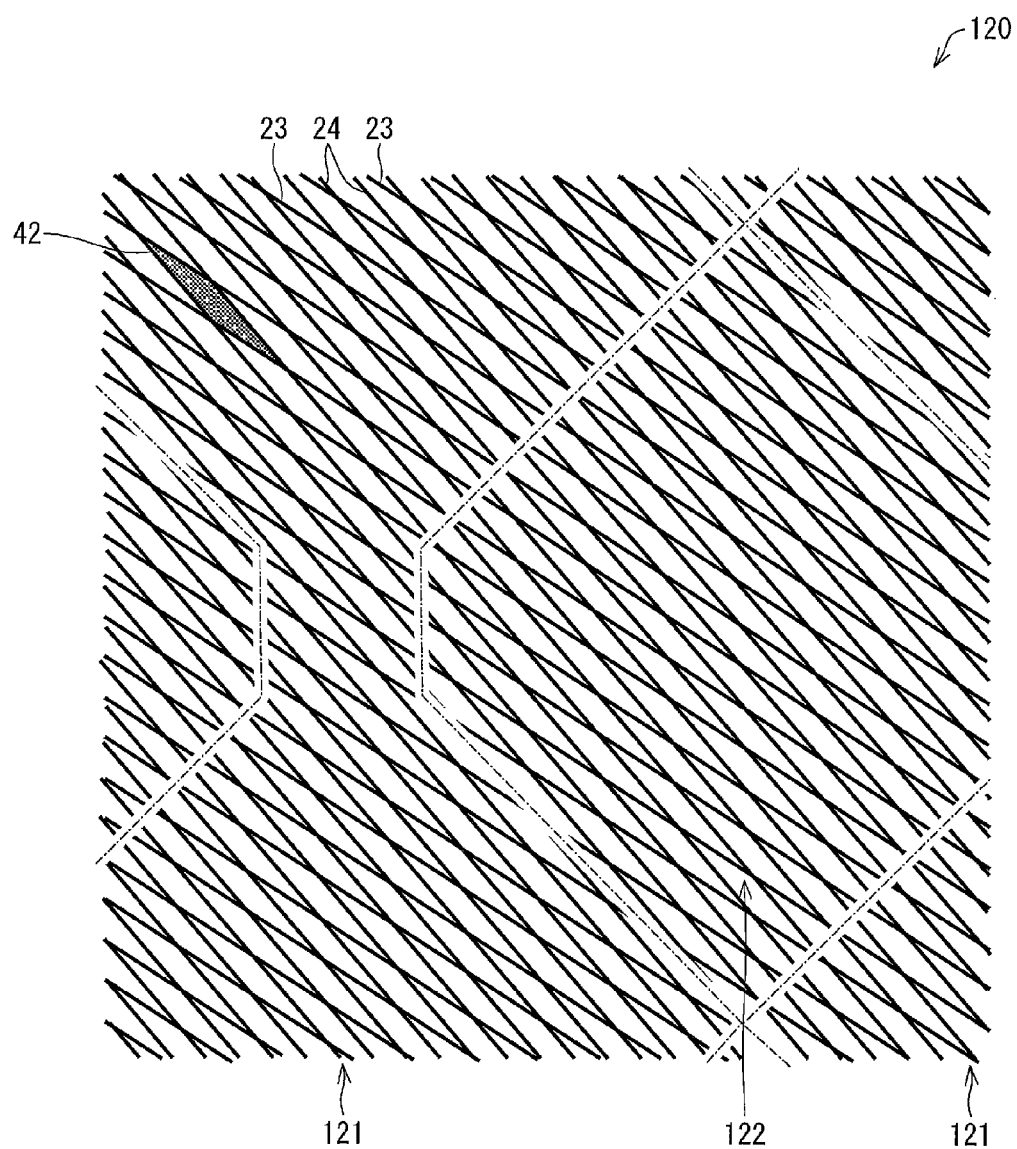
FIG. 19 is a plan view illustrating the details of a configuration of the second electrode layer of the touch panel substrate according to Embodiment 2 of the present invention.
Figure 20:
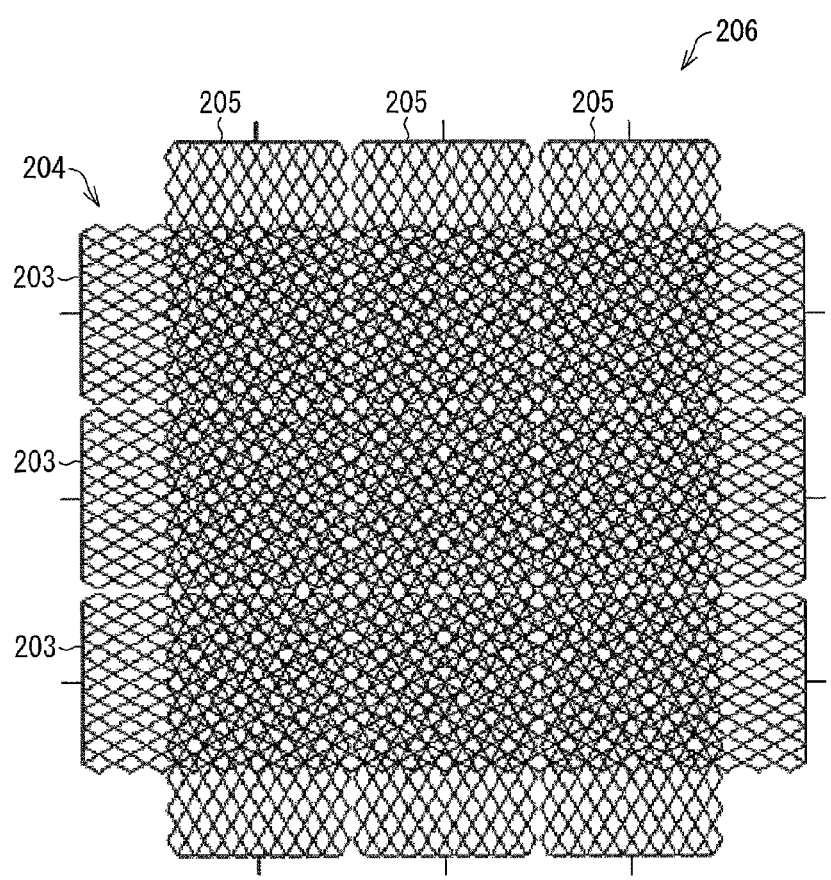
FIG. 20 is a plan view illustrating a configuration in which a first electrode and a second electrode are overlaid according to an embodiment of prior art disclosed in Patent Document 1.

FIG. 19 is a plan view illustrating the details of the configuration of the second electrode layer 120 of the touch panel substrate 102 according to the present embodiment. For purposes of explanation, FIG. 19 includes dashed lines that illustrate the boundaries between adjacent second sensor electrodes.

The second electrode layer 120 of the present embodiment includes a conductive wire pattern formed by third conductive wires 23 and fourth conductive wires 24. The same conductive wire pattern used in Embodiment 1 can be used, and therefore a detailed description of the conductive wire pattern is omitted here.

In the second electrode layer 120 of the present embodiment, the third conductive wires 23 and the fourth conductive wires 24 are divided into a plurality of regions to form the second sensor electrodes 121. These second sensor electrodes 121 are shaped differently than the second sensor electrodes 21 in Embodiment 1.

In other words, divisions that follow the shapes of the second sensor electrodes 121 are inserted in the conductive wire pattern formed by the third conductive wires 23 and the fourth conductive wires 24 in order to form the first sensor electrodes 121.

In this conductive wire pattern, the non-second sensor electrode 121 regions are the second floating electrodes 122.

<Mesh Pattern>

Like the touch panel substrates shown in FIG. 9 and FIGS. 11 to 14, once the first electrode layer 110 and the second electrode layer 120 are overlaid in the touch panel substrate of the present embodiment, the first conductive wires 13, the second conductive wires 14, the third conductive wires 23, and the fourth conductive wires 24 each run in different directions.

In this state, each pair of two adjacent first conductive wires 13 and two adjacent third conductive wires 23 form first quadrilaterals 51 that are square-shaped when viewed in a plan view. Moreover, each pair of two adjacent second conductive wires 14 and two adjacent fourth conductive wires 24 form second quadrilaterals 52 that are also square-shaped when viewed in a plan view.

Here, the length of at least one side of each first quadrilateral 51 is equal to the gap between adjacent first conductive wires 13. Moreover, the length of at least one side of each second quadrilateral 52 is equal to the gap between adjacent second conductive wires 14.

As described above, the lengths of adjacent sides of the parallelograms 41 of the first electrode layer 110 are different, and the gap between adjacent first conductive wires 13 is different than the gap between adjacent second conductive wires 14. Moreover, the lengths of adjacent sides of the parallelograms 42 of the second electrode layer 120 are different, and the gap between adjacent third conductive wires 23 is different than the gap between adjacent fourth conductive wires 24.

Therefore, the first quadrilaterals 51 and the second quadrilaterals 52 are shaped differently in terms of size and area; that is, the first quadrilaterals 51 and the second quadrilaterals 52 have non-identical quadrilateral shapes.

As in the touch panel substrate 2 of Embodiment 1, this allows for greater design freedom when designing conductive wire patterns for reducing occurrence of the moiré effect than in conventional touch panel substrates in which only a single type of quadrilateral shape is formed.

This, in turn, makes it possible to provide a touch panel substrate 102 with which occurrence of the moiré effect can be reduced when used with a display device 3 in which any of a variety of pixel array patterns is used.

SUMMARY

The touch panel substrate of the present invention includes: a first electrode layer and a second electrode layer, each provided with conductive wires, wherein the first electrode layer includes a plurality of mutually parallel first conductive wires and a plurality of mutually parallel second conductive wires that intersect with the first conductive wires, wherein the second electrode layer includes a plurality of mutually parallel third conductive wires and a plurality of mutually parallel fourth conductive wires that intersect with the third conductive wires, wherein an angle between the first conductive wires and the second conductive wires is not equal to 90°, and the first conductive wires and second conductive wires form a lattice pattern that includes a plurality of parallelograms in which in each parallelogram, adjacent sides have different lengths, wherein an angle between the third conductive wires and the fourth conductive wires is not equal to 90°, and the third conductive wires and fourth conductive wires form a lattice pattern that includes a plurality of parallelograms in which in each parallelogram, adjacent sides have different lengths, wherein the first electrode layer and the second electrode layer being overlaid in a plan view causes the adjacent first conductive wires and adjacent third conductive wires to define a plurality of first quadrilaterals, and the adjacent second conductive wires and adjacent fourth conductive wires to define a plurality of second quadrilaterals, and wherein the first quadrilaterals and the second quadrilaterals are not identical.

This allows for greater design freedom when designing conductive wire patterns for reducing occurrence of the moiré effect than in conventional touch panel substrates in which only a single type of quadrilateral shape is formed by the two electrode layers.

This, in turn, makes it possible to provide a touch panel substrate with which occurrence of the moiré effect can be reduced when used with a display device in which any of a variety of pixel array patterns is present.

Moreover, the first quadrilaterals and second quadrilaterals may be square-shaped.

This reduces the perceptibility of the conductive wires for a viewer viewing the display surface of the display device once the touch panel substrate has been positioned thereon.

Moreover, the conductive wire pattern formed by the third conductive wires and the fourth conductive wires may have the same general configuration as the conductive wire pattern formed by the first conductive wires and the second conductive wires but be rotated 90° clockwise therefrom when viewed in a plan view.

This makes it easier to determine the conductive wire pattern to use for the other electrode layer once the conductive wire pattern for the first electrode layer has been determined.

This configuration makes the first quadrilaterals and the second quadrilaterals square-shaped, thereby reducing the perceptibility of the conductive wires for a viewer viewing the display surface of the display device once the touch panel substrate has been positioned thereon.

Moreover, in the touch panel substrate of the present invention: the first electrode layer may include a plurality of first sensor electrodes that are insulated from one another, and the second electrode layer may include a plurality of second sensor electrodes that are insulated from one another, the first sensor electrodes may be formed by severing the first conductive wires and the second conductive wires to divide the conductive wire pattern formed by the first conductive wires and the second conductive wires into a plurality of regions, and the second sensor electrodes may be formed by severing the third conductive wires and the fourth conductive wires to divide the conductive wire pattern formed by the third conductive wires and the fourth conductive wires into a plurality of regions.

Severing the conductive wires in order to divide the conductive wire patterns into a plurality of regions and thereby form the first sensor electrodes and the second sensor electrodes makes it possible to form the sensor electrodes in any shape.

Moreover, the electronic device of the present invention may include: the touch panel substrate; and a display device, wherein a display surface of the display device includes a plurality of pixels arranged in a matrix pattern, and wherein a diagonal length of the first quadrilaterals and a diagonal length of the second quadrilaterals is no more than four times the gap between adjacent pixels.

This reduces the perceptibility of the conductive wires in the touch panel substrate for a viewer viewing the display surface of the display device.

Moreover, the method of manufacturing an electronic device of the present invention is a method of manufacturing an electronic device that includes a display device in which a plurality of pixels are arranged in a matrix pattern and a touch panel substrate provided on a display surface of the display device, wherein the touch panel substrate includes a first electrode layer provided with a plurality of conductive wires that run in two different directions as well as a second electrode layer provided with a plurality of conductive wires that run in two different directions, and when viewed in a plan view, the touch panel substrate includes a plurality of first quadrilaterals and second quadrilaterals that are formed by the conductive wires, are not identical to one another, and are arranged in a matrix pattern, the method including: determining, on the basis of a pixel arrangement of the display device, sizes for the first quadrilaterals and the second quadrilaterals as well as directions in which to arrange the first quadrilaterals and second quadrilaterals; and forming, relative to the pixel arrangement, conductive wires that run parallel to one pair of opposite sides of the first quadrilaterals and conductive wires that run parallel to one pair of opposite sides of the second quadrilaterals to form the first electrode layer as well as forming conductive wires that run parallel the other pair of opposite sides of the first quadrilaterals and conductive wires that run parallel to the other pair of opposite sides of the second quadrilaterals to form the second electrode layer.

This makes it possible produce a touch panel substrate having conductive wire patterns that can more effectively reduce occurrence of the moiré effect when the touch panel substrate is fixed to a display device. This also makes it possible to produce an electronic device provided with such a touch panel substrate and a display device.

The present invention is not limited to the embodiments described above, and various modifications can be made without departing from the scope of the claims. Therefore, embodiments obtained by appropriately combining the techniques disclosed in different embodiments are included in the technical scope of the present invention. Furthermore, the techniques disclosed in each embodiment can be combined to achieve new technical features.

INDUSTRIAL APPLICABILITY

The present invention is suitable for application to a touch panel substrate as well as to an electronic device provided with a touch panel substrate and a display device.

DESCRIPTION OF REFERENCE CHARACTERS 1 electronic device
2, 102 touch panel substrate
3 display device
10, 110 first electrode layer
11, 111 first sensor electrode
13 first conductive wire
14 second conductive wire
20, 120 second electrode layer
21, 121 second sensor electrode
23 third conductive wire
24 fourth conductive wire
41 parallelogram
42 parallelogram
51 first quadrilateral
52 second quadrilateral

What is claimed is:

1. A touch panel substrate, comprising:
a first electrode layer and a second electrode layer,
wherein the first electrode layer includes a plurality of mutually parallel first conductive wires and a plurality of mutually parallel second conductive wires that intersect with the first conductive wires,
wherein the second electrode layer includes a plurality of mutually parallel third conductive wires and a plurality of mutually parallel fourth conductive wires that intersect with the third conductive wires,
wherein an angle between the first conductive wires and the second conductive wires is not equal to 90°, and the first conductive wires and second conductive wires form a lattice pattern that includes a plurality of parallelograms in which in each parallelogram, adjacent sides have different lengths,
wherein an angle between the third conductive wires and the fourth conductive wires is not equal to 90°, and the third conductive wires and fourth conductive wires form a lattice pattern that includes a plurality of parallelograms in which in each parallelogram, adjacent sides have different lengths,
wherein the first electrode layer and the second electrode layer being overlaid in a plan view causes the adjacent first conductive wires and adjacent third conductive wires to define a plurality of first quadrilaterals, and the adjacent second conductive wires and adjacent fourth conductive wires to define a plurality of second quadrilaterals, and
wherein the first quadrilaterals and the second quadrilaterals are not identical.

2. The touch panel substrate according to claim 1, wherein the first quadrilaterals and the second quadrilaterals are square-shaped.

3. The touch panel substrate according to claim 1,
wherein the first electrode layer includes a plurality of first sensor electrodes that are insulated from one another, and the second electrode layer includes a plurality of second sensor electrodes that are insulated from one another, wherein the first sensor electrodes are formed by severing the first conductive wires and the second conductive wires to divide a conductive wire pattern formed by the first conductive wires and the second conductive wires into a plurality of regions, and wherein the second sensor electrodes are formed by severing the third conductive wires and the fourth conductive wires to divide a conductive wire pattern formed by the third conductive wires and the fourth conductive wires into a plurality of regions.

4. An electronic device, comprising:

the touch panel substrate according to claim 1; and a display device, wherein a display surface of the display device includes a plurality of pixels arranged in a matrix pattern, and wherein a diagonal length of the first quadrilaterals and a diagonal length of the second quadrilaterals are no more than four times a gap between adjacent pixels.

5. A method of manufacturing an electronic device, comprising:

forming a first electrode layer; and forming a second electrode layer over the first electrode layer, wherein the first electrode layer includes a plurality of mutually parallel first conductive wires and a plurality of mutually parallel second conductive wires that intersect with the first conductive wires, wherein the second electrode layer includes a plurality of mutually parallel third conductive wires and a plurality of mutually parallel fourth conductive wires that intersect with the third conductive wires, wherein an angle between the first conductive wires and the second conductive wires is not equal to 90°, and the first conductive wires and second conductive wires form a lattice pattern that includes a plurality of parallelograms in which in each parallelogram, adjacent sides have different lengths, wherein an angle between the third conductive wires and the fourth conductive wires is not equal to 90°, and the third conductive wires and fourth conductive wires form a lattice pattern that includes a plurality of parallelograms in which in each parallelogram, adjacent sides have different lengths, wherein the first electrode layer and the second electrode layer being overlaid in a plan view causes the adjacent first conductive wires and adjacent third conductive wires to define a plurality of first quadrilaterals, and the adjacent second conductive wires and adjacent fourth conductive wires to define a plurality of second quadrilaterals, and wherein the first quadrilaterals and the second quadrilaterals are not identical.

6. The touch panel substrate according to claim 2, wherein the first electrode layer includes a plurality of first sensor electrodes that are insulated from one another, and the second electrode layer includes a plurality of second sensor electrodes that are insulated from one another, wherein the first sensor electrodes are formed by severing the first conductive wires and the second conductive wires to divide a conductive wire pattern formed by the first conductive wires and the second conductive wires into a plurality of regions, and wherein the second sensor electrodes are formed by severing the third conductive wires and the fourth conductive wires to divide a conductive wire pattern formed by the third conductive wires and the fourth conductive wires into a plurality of regions.

7. An electronic device, comprising:

the touch panel substrate according to claim 2; and a display device, wherein a display surface of the display device includes a plurality of pixels arranged in a matrix pattern, and wherein a diagonal length of the first quadrilaterals and a diagonal length of the second quadrilaterals are no more than four times a gap between adjacent pixels.

8. An electronic device, comprising:

the touch panel substrate according to claim 3; and a display device, wherein a display surface of the display device includes a plurality of pixels arranged in a matrix pattern, and wherein a diagonal length of the first quadrilaterals and a diagonal length of the second quadrilaterals are no more than four times a gap between adjacent pixels.

9. An electronic device, comprising:

the touch panel substrate according to claim 6; and a display device, wherein a display surface of the display device includes a plurality of pixels arranged in a matrix pattern, and wherein a diagonal length of the first quadrilaterals and a diagonal length of the second quadrilaterals are no more than four times a gap between adjacent pixels.

* * * * *